US012461921B2

(12) United States Patent
Ghosal et al.

(10) Patent No.: US 12,461,921 B2
(45) Date of Patent: Nov. 4, 2025

(54) UTILIZING METADATA-BASED CLASSIFICATIONS FOR DATA DISCOVERY IN DATA SETS

(71) Applicant: OneTrust LLC, Atlanta, GA (US)

(72) Inventors: Aniruddha Ghosal, Sandy Springs, GA (US); Shane Wiggins, Atlanta, GA (US); Kotreshi Sakragoudra, Marietta, GA (US); Kevin Jones, Atlanta, GA (US); Laurence McNally, Atlanta, GA (US)

(73) Assignee: OneTrust, LLC, Atlanta, GA (US)

( * ) Notice: Subject to any disclaimer, the term of this patent is extended or adjusted under 35 U.S.C. 154(b) by 0 days.

(21) Appl. No.: 18/505,890

(22) Filed: Nov. 9, 2023

(65) Prior Publication Data

US 2024/0160632 A1 May 16, 2024

Related U.S. Application Data

(60) Provisional application No. 63/383,115, filed on Nov. 10, 2022.

(51) Int. Cl.
*G06F 16/2457* (2019.01)
*G06F 16/21* (2019.01)
*G06F 16/28* (2019.01)

(52) U.S. Cl.
CPC ...... *G06F 16/24573* (2019.01); *G06F 16/211* (2019.01); *G06F 16/285* (2019.01)

(58) Field of Classification Search
CPC . G06F 16/24573; G06F 16/211; G06F 16/285
(Continued)

(56) References Cited

U.S. PATENT DOCUMENTS

2009/0276446 A1* 11/2009 Graf ................ G06F 16/258
2021/0133557 A1* 5/2021 Iyoob ............... G06F 40/205
(Continued)

OTHER PUBLICATIONS

WO 2024/102934 A1 Written Opinion of the International Searching Authority. https://patentscope.wipo.int/search/en/detail.jsf?docId=WO2024102934 May 16, 2024. (Year: 2024).*

*Primary Examiner* — Michael Pham
(74) *Attorney, Agent, or Firm* — Ballard Spahr LLP

(57) ABSTRACT

This disclosure describes one or more implementations of systems, non-transitory computer-readable media, and methods that utilize a repository of metadata-based recommendations to classify data sources using metadata from the data sources. For example, the disclosed systems can generate a repository of metadata-based recommendations that indicate recommended classifications for objects within data sources through metadata associated with a data source schema. In some instances, the disclosed systems identify metadata from a data source schema associated with the data source. Subsequently, the disclosed systems can match the identified metadata to a metadata-based recommendation via metadata mappings in the metadata-based recommendation repository to select a metadata-based recommendation. Furthermore, the disclosed systems can also utilize a classifier model to generate predicted labels for the data source and update the metadata-based recommendation repository with a mapping between the predicted labels and metadata corresponding to the data source schema of the data source.

20 Claims, 11 Drawing Sheets

(58) Field of Classification Search
 USPC .......................................................... 707/722
 See application file for complete search history.

(56) References Cited

U.S. PATENT DOCUMENTS

2021/0279363 A1* 9/2021 Jones .................. G06F 16/9558
2023/0367891 A1* 11/2023 Joshi ...................... G06F 21/62

* cited by examiner

| Metadata Id | Data Source Name | Object | Field | Xpath | Recommended Term(s) | Confidence Score(s) | Status |
|---|---|---|---|---|---|---|---|
| 1a36f9e3-7d31-4e20-9713-Ffc865e289eb | Datasource 1 | Company1 | SSN | ToDoList»SSN | Social Security Number | 91.19 | Approved |
| 5817275f-F407-49a7-8c41-77c4b44a754d | Datasource 1 | Items | City | ToDoList»Items»City | City | 68.92 | Approved |
| 1b402fd6-42cf-Bff6-D1f2b6b80cfe | Datasource 1 | Company1 | Country | ToDoList»Country | Country | 73.43 | Approved |
| 2aabae9a-F4b9-4f4f-8795-75c4f02a979f | Datasource 2 | Employee | Age | OneTrust»Employee»Age | Date | 64.02 | Rejected |
| 2ccdf7bd-Ad12-4360-Baf1-17def672a744 | Datasource 2 | Employee | Email | OneTrust»Ticket»Email | Email | 96.89 | Approved |

*Fig. 6*

UTILIZING METADATA-BASED CLASSIFICATIONS FOR DATA DISCOVERY IN DATA SETS

CROSS-REFERENCE TO RELATED APPLICATIONS

This application claims priority to, and the benefit of, U.S. Provisional Patent Application No. 63/383,115, filed on Nov. 10, 2022, which is incorporated herein by reference in its entirety.

BACKGROUND

Computing environments operated by organizations frequently use multiple software tools and storage systems operated by various groups of users. Consequently, a given organization's computing environment may generate or otherwise access large amounts (e.g., petabytes) of data. These large datasets accessible to various computing systems and software tools can prevent identification and/or retrieval of data of interest, such as sensitive data. While scanning tools exist that can use AI-based classifiers to find and classify sensitive data in structured databases (such as RDBMS), applying such classifiers to large datasets can consume extensive computing resources (e.g., processing power, network bandwidth, etc.) while also being limited in operation.

For example, conventional scanning tools often impact networks and systems because of the large amount of data. In particular, many conventional scanning tools utilize AI-based classifiers to identify and/or retrieve data of interest via an analysis (or scan) of the large amount of data. In many cases, the conventional scanning tools analyze (or scan) the data (e.g., data structure and data content) to identify (or retrieve) data of interest (e.g., through an identification of sensitive data or generating label classifications for the data). Such a process is often time consuming and computationally expensive. Accordingly, upon accessing or receiving a large amount of data, many conventional systems utilize AI-based classifiers on the data with substantial negative impacts on networks and systems (e.g., because of computational resource load and excessive processing time).

In addition, conventional scanning tools that utilize AI-based classifiers to classify data in a database are oftentimes limited in operation. For instance, in many cases, conventional systems that utilize AI-based classifiers are trained on structured data. Accordingly, such conventional AI-based classification systems are incapable of accurately analyzing and classifying data structures that deviate from a data structure utilized in training data. This, in many instances, limits the applicability and/or operability of conventional scanning tools for large datasets with varied data and/or structure.

In addition to the foregoing, recent surges in data usage has introduced complex challenges for large organizations, particularly concerning data sprawl, which poses significant risks to data security and privacy. Data sprawl, in this context, pertains to the proliferation of independent software applications that handle and store data, including sensitive or personal information. This proliferation makes it challenging to monitor what software applications are tracking what data and the usage of data by software applications, thereby elevating the risk of data breaches and security incidents.

These and other problems exist with regard to conventional data scanning tools.

SUMMARY

The disclosure describes one or more aspects that provide benefits and solve one or more of the foregoing or other problems in the art with systems, non-transitory computer-readable media, and computer-implemented methods that utilize a repository of metadata-based recommendations to classify arbitrary data sources (e.g., structured and/or unstructured data) with improved speed and efficiency using lightweight metadata from the data sources. In one or more implementations, the disclosed systems generate a repository of metadata-based recommendations that indicate recommended classifications for objects within data sources through metadata associated with a data source schema. In some instances, the disclosed systems identify metadata from a data source schema associated with the data source. Subsequently, in one or more aspects, the disclosed systems match the identified metadata to a metadata-based recommendation via metadata mappings in the metadata-based recommendation repository to select a metadata-based recommendation. Indeed, the metadata-based recommendation includes one or more suggested labels for data in the data source and/or a classification of sensitive personal data in the data source. Additionally, upon identifying low confidence metadata matches (or no metadata matches) in the metadata-based recommendation repository for a data source, the disclosed systems, in some cases, utilizes a classifier model to generate predicted labels for the data source and updates the metadata-based recommendation repository with a mapping between the predicted labels and metadata corresponding to the data source schema of the data source.

BRIEF DESCRIPTION OF THE DRAWINGS

The detailed description is described with reference to the accompanying drawings in which:

FIG. 6 illustrates exemplary record of a metadata-based recommendation repository utilized by a data discovery system in accordance with one or more implementations.

DETAILED DESCRIPTION

Figure 1:
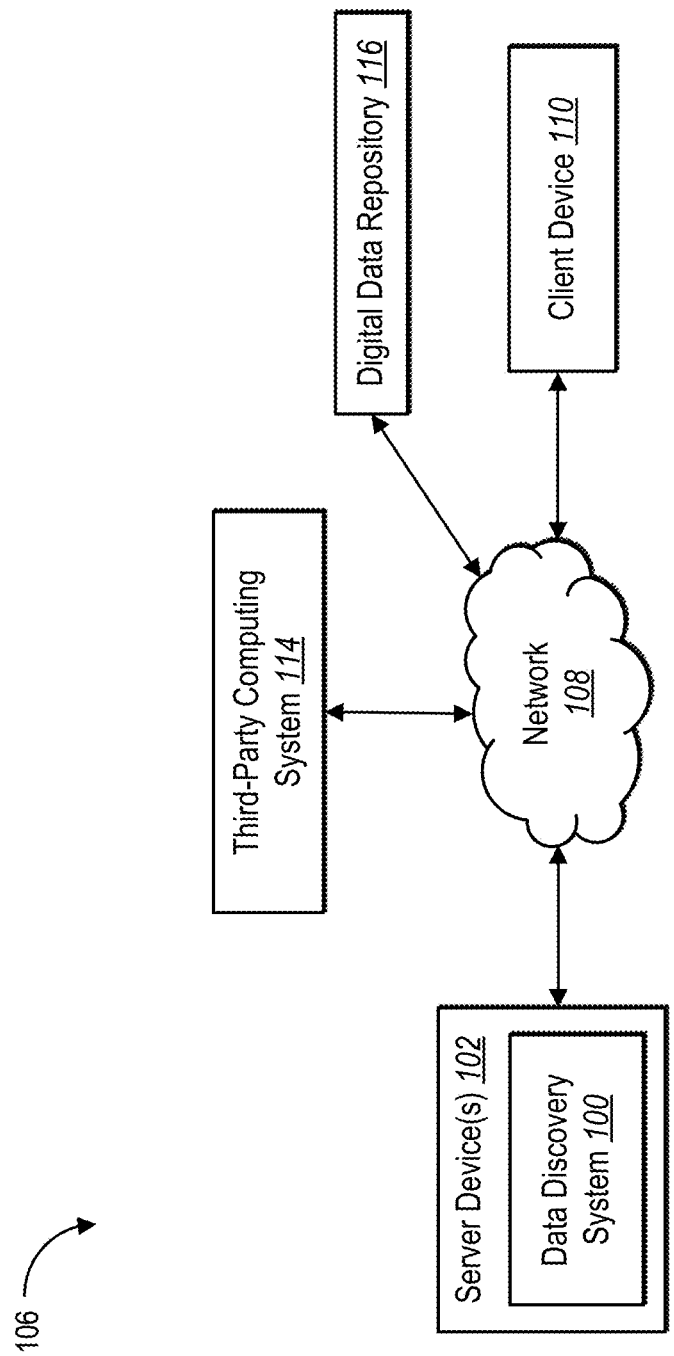
FIG. 1 illustrates a schematic diagram of an example environment in which a data discovery system operates in accordance with one or more implementations.

One or more aspects of the present disclosure include a data discovery system that utilizes a repository of metadata-based recommendations to classify a data source utilizing metadata from a data source schema of the data source. To illustrate, the data discovery system can identify a data source schema (and metadata for the schema) corresponding to a set of data elements for a data source. Moreover, the data discovery system can determine one or more suggested labels for the data source schema by utilizing a metadata-based recommendation repository having metadata-based recommendations that indicate labels for categorizing (or classifying) data elements. In particular, the data discovery system can match metadata from the data source schema to a metadata-based recommendation from the metadata-based recommendation repository (to select a metadata-based recommendation for the data source schema). Then, upon selecting a metadata-based recommendation, the data discovery system can modify a data inventory by applying one or more classification labels from the selected metadata-based recommendation to one or more inventory objects representing the data source. In some cases, the data discovery system also automatically augments the metadata-based recommendation repository by utilizing a classifier model to generate predicted labels for a data source (with a low confidence and/or failed metadata match) to create a mapping between the predicted labels and metadata corresponding to a data source schema of the data source within the repository.

As mentioned above, the data discovery system can classify data sources (e.g., structured and/or unstructured data) using metadata from the data sources with a metadata-based recommendation repository. In particular, the data discovery system can utilize a data schema corresponding to a data source to classify one or more elements of the data source (e.g., without accessing and/or analyzing data entries or elements of the data source) via the metadata-based recommendation repository. For instance, the data discovery system identifies metadata from the data source schema and selects a metadata-based recommendation from the metadata-based recommendation repository by matching the metadata to the metadata-based recommendation. Indeed, by utilizing metadata matching to classify the data source, the data discovery system can classify an arbitrary data source without performing an analysis of data elements within the data source.

In one or more aspects, the data discovery system utilizes a selected metadata-based recommendation to classify the data source. Indeed, the metadata-based recommendation can include one or more labels (e.g., labels for table names, column names) for particular inventory objects (e.g., tables, columns, databases, headers) associated with the data source schema. In addition, the metadata-based recommendation can also include indicators (or flags) to indicate a particular inventory object associated with the data source schema as a particular type of data (e.g., sensitive data, personal identifiable information, numerical data, text data).

Additionally, in one or more aspects, the data discovery system utilizes a dynamically updating metadata-based recommendation repository that adapts (and self-augments) by congruently (and selectively) utilizing a classifier model. In particular, in one or more implementations, the data discovery system determines that a metadata-based recommendation match is a low confidence match with a data source schema (e.g., via confidence scores associated with the match, via user feedback within a graphical user interface, via an inability to determine a match with particular metadata). In response, the data discovery system can utilize a classifier model with the data source (e.g., for the portion with the low confidence metadata match) to classify (or label) the data source. Furthermore, the data discovery system can utilize a predicted label(s) from the classifier model and a mapping to particular metadata from the data source schema to generate a metadata-based recommendation for the metadata-based recommendation repository.

Furthermore, in one or more instances, the data discovery system continuously updates a data classification for a data source via a metadata scan of the data source. To illustrate, in one or more aspects, the data discovery system utilizes a metadata scan to identify modified metadata from a data source schema (e.g., indicating a change in the data source schema). Upon identifying modified metadata, the data discovery system matches the additional metadata from the modified metadata to a metadata-based recommendation from the metadata-based recommendation repository to determine an additional label (or classification) for the data source. In some cases, the data discovery system utilizes a classifier to generate a predicted label(s) for data element corresponding to the additional metadata (identified from the modified metadata).

The disclosed data discovery system provides several advantages over conventional systems. In contrast to many conventional scanning tools that utilize AI-based classifiers with a substantial impact on networks and system to process large amounts of data, the data discovery system can utilize a repository of metadata-based recommendations to classify arbitrary data sources with improved speed and efficiency using lightweight metadata from the data sources. Indeed, the data discovery system reduces the impact on networks and systems while classifying large data sources. By utilizing (non-intrusive) metadata from a data source with a self-augmenting metadata-based recommendation repository instead of processing (or analyzing), via an AI-based classifier, data elements (or objects) within the data source, the data discovery system can speed up classification of a data source while also reducing the computational resources (and processing time) on a network and/or system. Accordingly, the data discovery system classifies arbitrary (and size varying) data sources with improved speed and efficiency using lightweight metadata from the data sources with the self-augmenting metadata-based recommendation repository.

Additionally, the data discovery system also improves the operability of data classifying (and/or scanning) tools. In particular, unlike conventional scanning tools that often rely on AI-based classifiers trained on (and only operable with) specific instances of structured data, the data discovery system utilizes a self-augmenting metadata-based recommendation repository that dynamically adapts to various instances of structured and/or unstructured data sources. For example, upon identifying low confidence metadata matches (or no metadata matches) in the metadata-based recommendation repository for a data source, the data discovery system can utilize a classifier model to generate predicted labels for the data source and update the metadata-based recommendation repository with a mapping between the predicted labels and metadata corresponding to the data source schema of the data source. Indeed, the data discovery system can automatically augment the metadata-based recommendation repository with updated mappings between data source metadata and classifications to increase the applicability and operability of a digital data scanning tool (of the data discovery system) for large datasets with varied data and/or structure (or no structure).

As illustrated by the foregoing discussion, the present disclosure utilizes a variety of terms to describe features and advantages of the data discovery system. Detail is hereinafter provided regarding the meaning of such terms. As used herein, the term "data source" refers to a collection of digital information. In particular, a data source can include a collection of digital structured and/or non-structured information that is organized via (or associated with) data source schemas, metadata, databases, data inventory objects, and/or data elements. In addition, a data source can include databases (or other collections of information) that include data tables, table headers, columns, column headers, data elements (e.g., cell data) and/or data arrays that include a set of information represented with indexes and corresponding data elements.

Additionally, as used herein, the term "data source schema" (sometimes referred to as "schema" or "data schema") refers to data representing definitions, mappings, and/or a modelling for a data source. In particular, a data source schema can include a definition (e.g., via metadata as text and/or graphics) that describes components of a data source, such as, but not limited to, database types, database tables, fields, table names, column names, table data types, column data types, data source relationships, application types for databases, database functions, directories, XML schemas, database procedures, database scheduled jobs, and/or database packages.

In one or more instances, a data source schema can include metadata that indicates and/or represents the various components of a data source (as described above). For example, metadata can include data, such as text data, graphical representations, and/or mappings, that represent the various components of a data source. In some instances, metadata describes various components of a data source without describing and/or revealing content of a data source (e.g., individual data elements and/or data cell information included within a data source).

Additionally, as used herein, the term "data element" refers to content of a data source. For example, a data element can include data entries within a data source. In particular, a data element can include a data entry as a data cell and/or tabular data within a database and/or data table (e.g., in a data column). Indeed, data elements can include individual data, such as, but not limited to names, IP addresses, ages, email addresses, addresses, phone numbers, SKU numbers, prices, gender, car model, VIN number, utility usage, and/or income. Furthermore, as used herein, the term "data inventory" refers to a relationship between a data element and a data source (or data asset) corresponding to the data element. Furthermore, as used herein, the term "inventory object" refers to a particular data object (e.g., table, column, database identifier, header) associated with a data source schema. For instance, in some cases, an inventory object includes a data table or data column corresponding to one or more data elements for a data source (for a data inventory from an associated data source schema).

As used herein, the term "metadata-based recommendation" refers to a collection of one or more labels for data elements of a data source, one or more descriptors for data elements of a data source, and/or data or category types for data elements of a data source. Indeed, a metadata-based recommendation can include a label set with one or more labels, a data source schema (or metadata) to which the label set is applicable, and a confidence level (or score) for the applicability of the label set. For example, a metadata-based recommendation can include one or more suggested labels for data elements of a data source to indicate or categorize the data elements (e.g., a table name, a column name). Additionally, in some cases a metadata-based recommendation can include information that indicates a descriptor for the data elements of a data source and/or data or category types, such as, but not limited to, a description of a field or data type (e.g., numerical, text, hash) and/or a category descriptor, such as, but not limited to, sensitive personal data, location data, password data, confidential data, and/or corrupted data. Moreover, as used herein, the term "metadata-based recommendation repository" refers to a storage medium or collection of metadata-based recommendations.

As used herein, the term "label" (or sometimes referred to as "suggested label") refers to a text classification that indicates a descriptor for a one or more data elements in a data source. For instance, a label can include a data value (e.g., text, number) that categorizes a set of data elements (or values) to a particular concept, object, place, and/or persons. In some instances, a label can include a header and/or name for a table and/or column. In one or more implementations, a label can include a database type, a data element type (e.g., numbers, hash, currency, files, time), and/or a category type (e.g., personal identifiable information (PII), passwords, publicly available data).

Furthermore, as used herein, the term "confidence score" (or sometimes referred to as "confidence level") refers to an indicator of a relationship between metadata (or data source schema elements) and a label. In one or more cases, the confidence score includes a relative distance between metadata from a data source schema and metadata corresponding to a metadata-based recommendation. In some instances, the confidence score includes a rating, from user feedback, that indicates whether or not a label matches for a set of data elements. Moreover, in one or more instances, the confidence score includes a probability prediction for a label representing a set of data elements. For example, the data discovery system can determine a label for a set of data elements (of a data source) to categorize the set of data elements with an associated confidence score or probability (e.g., 0.90 probability or score as an SSN label, 0.60 probability or score as a phone number label, 0.01 probability or score as a name label).

As used herein, the term "classifier" (or sometimes referred to as "classifier model") refers to a computer-based model that analyzes metadata and/or data elements (e.g., obtained by data scanners) of a data source to generate classifier labels for the data elements of the data sources. For instance, a classifier can include a machine learning model (e.g., a deep learning model, a rule-based model, a regression model, a natural language processor) that generates classifier labels for data elements (and/or metadata) of a data source. Moreover, as used herein, a "predicted label" (sometimes referred to as a "classifier predicted label") refers to a label generated for a set of data elements (or metadata) corresponding to a data source by a classifier model.

Furthermore, a machine learning classifier model can include a computer representation that can be tuned (e.g., trained) based on inputs to approximate unknown functions. In particular, a machine learning classifier model can include a computer representation that can be tuned (e.g., trained) based on inputs to generate classifier labels for a set of data elements (or metadata). In one or more implementations, parameters of a machine learning classifier model can be adjusted or trained to generate classifier labels for a set of data elements (or metadata) corresponding to a data source with a confidence score that satisfies a threshold confidence. Additionally, a machine learning classifier model can include, but is not limited to, one or more named entity recognition (NER) models, bidirectional encoder representations from transformers models (BERT), differentiable function approximators, contrastive language-image pre-training models, clustering models, Term Frequency Inverse Document Frequency (TF-IDF) encoders, convolutional neural networks, recurrent neural networks, generative adversarial neural network, or a combination thereof.

Turning ow to the figures, FIG. 1 illustrates a schematic diagram of a system environment 106 (e.g., a "system" 106) in which a data discovery system 100 can operate in accordance with one or more aspects. As illustrated in FIG. 1, the system 106 includes server device(s) 102, a network 108, a client device 110, a digital data repository 116, and a third-party computing system 114. As further illustrated in FIG. 1, the one or more components of the system 106 can communicate with each other via the network 108.

As shown in FIG. 1, the server device(s) 102 can include a variety of types of computing devices, including those described with reference to FIG. 11. The server device(s) 102 an include a data discovery system 100. Indeed, the server device(s) 102 (via the data discovery system 100 or a data management system) can identify, store, process, receive, utilize, manage, analyze, and/or distribute digital data and/or repositories of digital data.

Additionally, as described above, the data discovery system 100 can classify a data source utilizing metadata from a data source schema of the data source. In particular, the data discovery system 100 can determine (or generate) one or more labels for a data source schema by utilizing a metadata-based recommendation repository having metadata-based recommendations that indicate labels for categorizing (or classifying) data elements of a data source. In some instances, the data discovery system 100 can automatically augment a metadata-based recommendation repository by utilizing a classifier model to generate predicted labels for a data source (with a low confidence and/or failed metadata match) in accordance with one or more implementations herein.

As further shown in FIG. 1, the system 106 can include the client device 110. The client device 110 can modify, create, receive, and/or provide data (e.g., data sources, data source schemas) to the server device(s) 102. In addition, the client device 110 can also receive and display suggested labels for data sources from the server device(s) 102 (via the data discovery system 100). In some cases, the client device 110 can provide user selections (e.g., approvals, rejections) of one or more suggested labels to modify confidence scores corresponding to the one or more suggested labels.

As also shown in FIG. 1, the system 106 can include the digital data repository 116. In one or more aspects, the digital data repository 116 can include one or more metadata-based recommendation repositories. Indeed, the digital data repository 116 can include a collection of metadata-based recommendations (e.g., for various data sources). In some instances, the data discovery system 100 can augment the digital data repository 116 with additional metadata-based recommendations determined in accordance with one or more aspects herein. Furthermore, the data discovery system 100 can access the digital data repository 116 to determine labels for one or more data elements of a data source via a matching of metadata from the data source (or data source schema) to metadata corresponding to the metadata-based recommendations in the digital data repository 116.

Furthermore, as shown in FIG. 1, the system 106 includes the third-party computing system 114. In one or more aspects, the third-party computing system 114 includes a computing device (or a network of computing devices) utilize one or more data sources. In some instances, the third-party computing system 114 can request (from the data discovery system 100) classification of data sources corresponding to the third-party computing system 114 using the digital data repository 116 (e.g., the metadata-based recommendations). Indeed, the data discovery system 100 can classify data elements from the data sources of the third-party computing system 114 using metadata-based recommendations determined from one or more other computing systems (or the third-party computing system 114) and stored in the digital data repository 116.

Also, although FIG. 1 illustrates the system 106 with the single client device 110, in one or more aspects, the system 106 can include additional client devices. For example, the system 106 can include a variety of different numbers of client devices corresponding to one or more users and/or data source administrators. Additionally, although FIG. 1 illustrates the system 106 with the single digital data repository 116, third-party computing system 114, and server device(s) 102, the system 106 can include a variety of different numbers of digital data repositories, third-party computing systems, and server devices.

Moreover, although FIG. 1 illustrates the data discovery system 100 implemented on the server device(s) 102, the data discovery system 100 can be implemented, in whole or in part, by other computing devices and/or components in the system 106. For example, the data discovery system 100 can be implemented, in whole or in part, on the third-party computing system 114 and/or the digital data repository 116.

Additionally, as shown in FIG. 1, the system 106 includes the network 108. As mentioned above, the network 108 can enable communication between components of the system 106. In some instances, the network 108 can include a suitable network and may communicate using any communication platform and technology suitable for transporting data and/or communication signals, examples of which are described with reference to FIG. 11. Moreover, although FIG. 1 illustrates certain components communicating via the network 108 (e.g., the server device(s) 102 and the client device 110), the various components of the system 106 can communicate and/or interact via other methods (e.g., the server device(s) 102 and the client device 110 can communicate directly).

Overview of Data Discovery System

Figure 2:
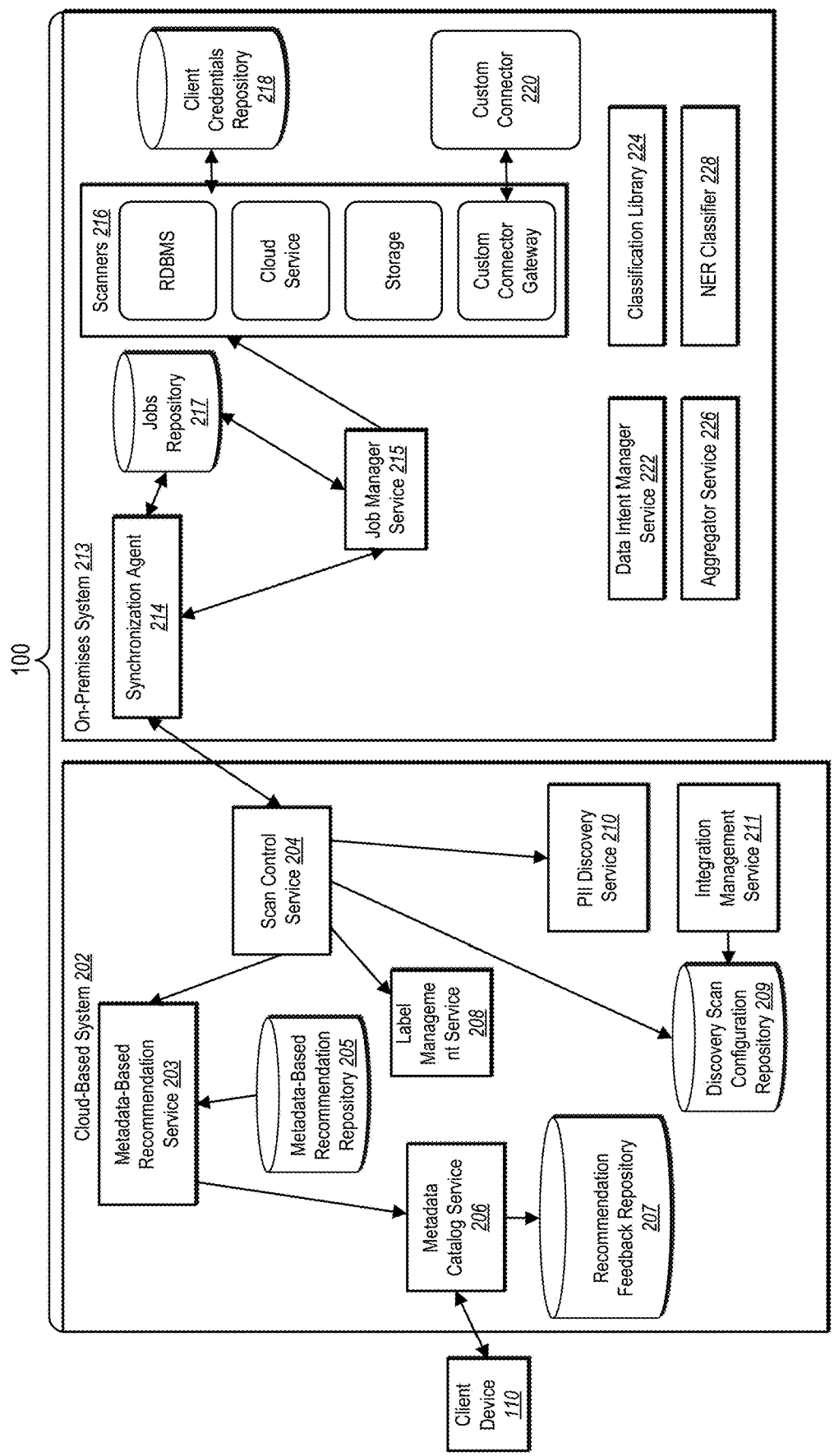
FIG. 2 illustrates a schematic diagram of an example environment in which a data discovery system operates with a cloud-based and on-premises system in accordance with one or more implementations.

In some cases, as an example the system environment 106, the data discovery system 100 includes a cloud-based system 202 and/or an on-premises system 213. For example, FIG. 2 depicts an example of a data discovery system 100 that includes the cloud-based system 202 and the on-premises system 213. In particular, in one or more aspects, the data discovery system 100 includes automation and intelligence features for discovering and classifying data of interest (e.g., personal and non-personal data), including structured and/or unstructured data, stored across different software and hardware systems and thereby enhance navigation and retrieval of this data (as described above). In FIG. 2, as an example in which the data discovery system 100 can operate, software components in the cloud-based system 202 are communicatively coupled with software components in the on-premises system 213.

In one example, the data discovery system 100 can locate data assets stored or executed on external systems. Data assets can be representations of the physical, technical systems, and objects within an organization's data sources that store/process the data. Examples of data assets include data sources, databases, schemas, tables, columns, applications, objects, fields, directories, folders, etc. used to organize and store data in electronic storage systems. The data discovery system 100 can be used to add discovered data assets to data inventories.

In some aspects, the data discovery system 100 can utilize a data inventory to store relationships between data elements and the data assets in which those data elements are found. For example, data elements can be individual pieces of information that are processed or collected. In an example involving personal data, types of data elements can include Social Security Numbers, first names, last names, IP addresses, ages, email addresses, etc.

In some cases, the data discovery system 100 can add discovered assets and data elements to a data inventory to facilitate retrieval of relevant data from these assets. For instance, a computing system (e.g., the third-party computing system 114) having access to the data inventory can receive a query, such as a data subject access request ("DSAR"), for data of a certain data element (e.g., Social Security Numbers). The computing system (e.g., the third-party computing system 114) can use the data inventory to find which external data assets and fields are mapped to that data element (e.g., "SSN" in Table X of data source 1 and "Social" in Table Y of data source 3). The computing system can send queries to those data assets referencing the appropriate data sources and fields in those data assets.

In some aspects, the cloud-based system 202 and the on-premises system 213 can be implemented on different computing systems operated by different entities. For instance, the cloud-based system 202 can be executed on a server system that provides a multi-tenant environment. The on-premises system 213 can be executed on a client system communicatively coupled to the server system. The multi-tenant environment can include a tenant (e.g., one or more user accounts, via client devices, sharing common privileges with respect to an application instance) accessible by the client system, as well as other tenants inaccessible to the client system (e.g., access controlled to permit only access from other client systems). For instance, in a tenant accessible by a client system, the repositories of the cloud-based system 202 depicted in FIG. 2 may be available to the client system, and instances of software components from the cloud-based system 202 may be available to the client system. In this example, other tenants have access to other versions of the repositories and other instances of the software components depicted in FIG. 2. In additional or alternative aspects, the cloud-based system 202 and the on-premises system 213 can be implemented on one or more computing systems operated by a single entity. For instance, the cloud-based system 202 can be operated on a first server system controlled by the entity, and can communicate with a second server system that is a client system implementing the on-premises system 213.

Cloud-Based System Example

As an example, the data discovery system 100 can operate within the cloud-based system 202 (as shown in FIG. 2). For example, the cloud-based system 202 depicted in FIG. 2 includes one or more software modules that are executed by one or more processing devices on a server system to perform various operations. These software modules can include an integration management service 211, a discovery scan configuration repository 209, a scan control service 204, a PII discovery service 210, a metadata catalog service 206, and a label management service 208. Unidirectional and bidirectional arrows in FIG. 2 depict, for illustrative purposes only, examples of the flow of data and/or function calls among software components and storage components.

In this example (in reference to FIG. 2), the discovery scan configuration repository 209 stores discovery scan configurations. For instance, each discovery scan configuration is a data object that includes settings for a discovery scan.

In one or more aspects, the data discovery system 100 can perform a discovery scan that involves scanning one or more data sources that are accessible via the client system. For example, a data source can include a database (e.g., Oracle, DB2, PostgreSQL, etc.) and/or a cloud storage system (S3, SMB, etc.). The data sources can be structured or unstructured data sources. The cloud-based system 202 can store records that include, for each data source, a unique name, credentials for the data source, scanning frequency for the data source, asset mapping for the data source, and/or activation.

In some cases, the data discovery system 100 can utilize settings for a discovery scan, such as, but not limited to a scan type, enablement of indexing for DSAR or other queries, limits on how many objects to scan, whether to scan tables or views, inclusion paths, and exclusion paths. Indeed, in one or more aspects, the data discovery system 100 can enable indexing to indicate that scan and classification results should be indexed for further searches. For example, the data discovery system 100 can populate an index with obfuscated classified information (values that have been passed through a 1-way SHA256 hash) that can then be used for queries against the data assets in a data inventory.

In some cases, the data discovery system 100 can utilize a metadata scan type (as a scan type) by utilizing metadata of client data sources to generate label recommendations. In some instances, the data discovery system 100 can utilize a classification scan type (as a scan type) by extracting data samples (e.g., a subset of the records in the data source) from the client data sources and providing the data samples as inputs to one or more of the classifiers. Furthermore, the data discovery system 100 can determine (or set) limits on how many objects to scan, such as, but not limited to including a maximum number of schemas, a maximum number of tables per schema, and/or a maximum number of rows per table.

On-Premises System Example

Furthermore, as another example, the data discovery system 100 can operate within an on-premises system 213. For example, the on-premises system 213 depicted in FIG. 2 includes a set of one or more software modules that are executed by one or more processing devices on a client system to perform various operations. The software modules, of the on-premises system 213, include a synchronization agent 214, a job manager service 215, a set of scanners 216, a classification library 224 with various classifiers and an NER classifier 228. As shown in FIG. 2, the on-premises system 213 also includes storage components. These storage components can include a jobs repository 217 and a client credentials repository 218. Unidirectional and bidirectional arrows in FIG. 2 depict, for illustrative purposes only, examples of the flow of data and/or function calls among software components and storage components.

In one or more instances, the job manager service 215 includes software that manages jobs on an on-premises system 213. For instance, managing jobs on the on-premises system 213 includes, but is not limited to, starting jobs, cancelling jobs, and keeping track of stages of the jobs in progress. In some cases, the job manager service 215 includes, but is not limited to, one or more APIs that the synchronization agent 214 calls to initiate a scan job at the on-premises system 213 or to cancel an existing scan at the on-premises system 213. The job manager service 215 also includes software that tracks tasks within a scan job.

In one or more aspects, a scanner 216 is a software tool that integrates with a third-party system (e.g., a third-party computing system 114) to search structured and/or unstructured data of interest on that system. For example, third-party systems can include, but are not limited to, web-based applications, databases, data lakes, and other data repositories. Furthermore, the client credentials repository 218 can include credentials (e.g., username and password, authentication token, etc.) that can be used by the scanner 216 (via the data discovery system 100) to access the third-party system. In a discovery scan, a scanner 216 can utilize credentials from the client credentials repository 218 to access a particular third-party system, to extract metadata for one or more data sources accessible via the third-party system, and/or to sample test data from these data sources accessible via the third-party system.

Examples of scanners 216 can include an app scanner used for any connector, including a custom connector 220, that leverages a RESTful API, a NoSQL scanner used for NoSQL connectors, an Office365 scanner used for Microsoft Graph-based connectors, an RDBMS used for JDBC supported RDBMS connectors, a Spark scanner used for Databricks and other spark-based connectors, and/or a storage scanner used for library/SDK based file system connectors. The scanners 216 can identify metadata for data sources in the third-party system (e.g., application, database types, table names, column names) and can extract test data from the data sources for further analysis.

In one or more aspects, the data discovery system 100 utilizes a classifier model to classify data elements of a data source. For example, the data discovery system 100 utilizes one or more of the classifier models to analyze the metadata and/or test data (e.g., via data elements) obtained by the scanners 216 and generates suggested classifier labels for data elements of the data sources. For example (as described above), a classifier can include a software tool that determines which data elements are found in a data source (e.g., via a predicted classification label). To illustrate, the data discovery system 100 can utilize a classifier model to analyze metadata in a data source to identify a particular classification label for one or more data elements. For instance, the data discovery system 100 can utilize a set of one or more classifiers to determine that a "Social Security Number" data element is found in a data source by analyzing the metadata in a data source (e.g., matching column names in one or more tables to a lookup list of "SSN, Social, SS #"). In one or more implementations, the data discovery system 100 can utilize a classifier model to analyze data elements (or properties of the data elements) within a data source to identify a particular classification label for the one or more data elements. For example, the data discovery system 100 can utilize a set of one or more classifiers to analyze the structure of data (e.g., via data elements) in the data source (e.g., a number formatted as NNN-NN-NNNN) to generate a predicted label of "SSN" for the data in the data source.

In some cases, a classifier can include a group of one or more sub-classifiers. For instance, a classifier group can output a higher-level classifier label to be applied to relevant data elements (e.g., for detecting that a data source includes credit cards used in US market) based on analyzing data samples or metadata of a data source. In addition, the classifier group can also nest multiple sub-classifiers that target a specific element of that theme (e.g., number patterns matching an AMEX credit card, number patterns matching a Visa credit card, etc.). Indeed, the data discovery system 100 can utilize a sub-classifier configured with confidence scores and discovery patterns to identify unique characteristics of data (e.g., mask, regular expression, digital check).

As mentioned above, the data discovery system 100 can also utilize a classifier model to generate a confidence score for a predicted classifier label for one or more data elements. For example, the data discovery system 100 can utilize confidence scores that indicate a relative distance between metadata, or a data sample being evaluated, and the closest surrounding classifier labels. For instance, a classifier that matches an "E-Mail" column name from a scanned data source to a classifier label of "E-Mail" from a look-up list can result in a confidence score of 100% (e.g., with the distance between the column name and the classifier label being 0). In some cases, if the classifier, via the data discovery system 100, can match a column name "Date" to a classifier label such as "Employment Date" or "Date of Birth" with a lower confidence score (e.g., less than 100%). In addition, the data discovery system 100 can use the classifier with additional context to improve the confidence score. For example, if a classifier, via the data discovery system 100, determines that "Date of Birth" is the classifier label for a date "Mar. 10, 1987" that is found in a column labeled "DOB," the classifier can assign a higher confidence score through the metadata (e.g., the column name) which helps reduce ambiguity.

In some cases, the data discovery system 100 utilizes a classifier with one or more discovery patterns to generate classifier labels. Indeed, the following table (Table 1) provides examples of discovery patterns that can be utilized by the data discovery system 100.

TABLE 1

| Discovery Pattern | Evaluates data sample for: |
|---|---|
| Data Type | Regularly used data formats (e.g., Text, Number, DateTime). |
| Date | A date range in years (YYYY-YYYY). |
| Digital Checks | A predicate to perform digital checks, valid numbers, and help reduce false positives. For instance, verifying that a detected sequence of numbers is the Denmark Personal Identification Number could involve applying a digital check in which first DIGIT_AT will be multiplied by 1 (e.g., 4 × 1), the next DIGIT-AT would be multiplied by 3 and so on, (e.g., 3 × 2). |
| Length Check | General range or a specific character count (e.g., driver's license ranges, 6 digits for an SSN). |
| Lookup | Specific phrase or term to match against the classifier's metadata (e.g., given names for first name classifier, gender identity). |
| Regex | A regular expression value that aligns with desired pattern. |

In one or more aspects, the data discovery system 100 utilizes an NER classifier, a machine learning model (e.g., a deep learning model), to analyze and classify metadata and/or data samples (as described above). For instance, the on-premises system 213 can apply the NER classifier when test data is not classified with sufficiently high confidence (e.g., does not satisfy a threshold confidence score) by other classifier models (and/or the metadata-based recommendations).

Example of a Discovery Scan

In some instances (in reference to FIG. 2), the data discovery system 100 enables the on-premises system 213 to initiate a discovery scan for a data source based on communications with the cloud-based system 202. For instance, the cloud-based system 202 can receive, from the client device 110, a user input (e.g., via a "scan now" command available in a UI with details of the data source details or a UI providing a list of data sources). The cloud-based system 202 can create, responsive to the user input, a discovery scan job in a table within the cloud-based system 202. The discovery scan job can include, for example, various job parameters, such as, but not limited to, an identifier of a data source to be scanned, a priority for the discovery scan job, label definition versions, etc.

Moreover, the data discovery system 100 can utilize the synchronization agent 214 to communicatively couple the on-premises system 213 and the cloud-based system 202. For instance, the synchronization agent 214 can monitor for new jobs, monitor status of ongoing jobs, start and/or cancel jobs, etc., by polling the scan control module of the cloud-based system 202. In an illustrative example, the synchronization agent 214 can periodically (e.g., every few seconds, every few minutes) poll the scan control service 204 to identify new jobs created on the cloud-based system 202. The scan control service 204 can respond with information regarding a state of a jobs table within the cloud-based system 202. An example of such information is a time stamp indicating when the jobs table within the cloud-based system 202 was last modified.

In some aspects, if the synchronization agent 214 detects, via this polling, a change in the jobs table within the cloud-based system 202 (e.g., a time stamp after a previous poll indicating a modification), the synchronization agent 214 submits an API call to the scan control service 204 to request details on the state changes. The scan control service 204 can respond by transmitting a list of jobs on the cloud-based system 202. Moreover, the synchronization agent 214 can compare the list of jobs included in the response with a list of jobs stored in the jobs repository 217 on the on-premises system 213.

Furthermore, the synchronization agent 214 can decide, based on the comparison, one or more actions to perform. For instance, if the synchronization agent 214 determines that a scan job is present on the cloud-based system 202 but not on the on-premises system 213, the synchronization agent 214 can initiate a new job. If the synchronization agent 214 determines that a scan job is present on the on-premises system 213 but not on the cloud-based system 202, the synchronization agent 214 can cancel the job on the on-premises system 213. If the synchronization agent 214 determines that a scan job is present on both the on-premises system 213 and the cloud-based system 202, the synchronization agent 214 can determine a status of the scan job (e.g., completed, failed, or timed-out) and send a status notification to the cloud-based system 202.

In some instances, when initiating a new job, the data discovery system 100 can enable the synchronization agent 214 to perform pre-processing tasks. For example, the synchronization agent 214 can perform pre-processing tasks, such as, but not limited to, retrieving a discovery scan configuration from the discovery scan configuration repository 209 and retrieving label definitions from a label management service 208.

For instance, a listing of jobs received from the scan control service 204 can include job contexts for each scan job. A job context can include a scan profile identifier, base label version (e.g., version of label definitions for pre-seeded labels available to all clients), and/or custom label version (e.g., version of label definitions for custom labels specific to the client computing system).

In some cases, the data discovery system 100 can enable the synchronization agent 214 to transmit, to the scan control service 204, a request (e.g., an API call with the scan profile identifier as an API parameter) for a discovery scan configuration corresponding to the scan profile identifier. The scan control service 204 can obtain the discovery scan configuration via a query to the discovery scan configuration repository 209 using the scan profile identifier. The discovery scan configuration can include settings for a scan job such as scan type, whether enabling optical character recognition for images should be performed, indexing, setting file sizes, include and exclude paths to scan, etc.

Furthermore, the data discovery system 100 can enable the label management service 208 on the cloud-based system 202 to manage label definitions. The label management service 208 can provide label definitions to the synchronization agent 214. Each label definition can identify, for the on-premises system 213, what each label (e.g., PII label) is and how the label should be detected in the data being scanned. For instance, a classifier for a particular label can include a list of sub-classifiers that differ in the format and regular expressions that are used to find a match to the particular label. In an illustrative example, an "SSN" label can include different classifiers to respectively detect different formats (NNN-NN-NNNN, NNN NN NNNN and NNNNNNNNN) of a social security number.

In one or more instances, the synchronization agent 214 can initiate a scan job by passing the job to the job manager service 215 via an appropriate API call.

Additionally, as a scan job passes through a pipeline of initiation, distribution, extraction, and classification implemented by the scanners 216 on the on-premises system 213, the data discovery system 100 can emit various events at different stages. For example, the data discovery system 100 can cause the job manager service 215 to subscribe to these events and manage the life cycle of the job/tasks based on these events. Indeed, the data discovery system 100 can emit event via the scanners 216 when the scanners 216 complete a particular phase of the scan job in a pipeline. In some aspects, the job manager service 215 updates the jobs repository 217 to indicate which of these events have been emitted for a given scan job.

Metadata-Based Recommendation Components

FIG. 2 also depicts the data discovery system 100 utilizing various software modules and data repositories in the cloud-based system 202 to facilitate metadata-based recommendations for classifying data elements in a data source. As mentioned above, a metadata-based recommendation can include suggested labels for data elements of the data sources that have been identified based on metadata extracted from one or more client data sources. For example, as shown in FIG. 2, the data discovery system 100 utilizes a metadata-based recommendation service 203, a metadata-based recommendation repository 205, and a recommendation feedback repository 207 to facilitate metadata-based recommendations for the one or more data element of the one or more data sources.

In one or more aspects, the data discovery system 100 causes the metadata-based recommendation service 203 to receive, via the scan control service 204, metadata that has been extracted from one or more client data sources. The metadata-based recommendation service 203 can use this metadata to query a metadata-based recommendation repository 205 for a metadata-based recommendation (via metadata matching) to be provided to a client device 110, as described in further detail herein (e.g., in reference to FIGS. 3-6 and 8).

Furthermore, the metadata-based recommendation repository 205 can store records of metadata-based recommendations. A record of a metadata-based recommendations can include (or otherwise identify) a label set with one or more suggested labels, a data source schema to which the label set is applicable, and a confidence level (or score) for the applicability of the label set. The data source schema can describe a set of properties for one or more data sources, such as, but not limited to, the names of data objects (e.g., tables) found in a data source, the names fields (e.g., columns) found in one or more of the data objects, etc.

In an illustrative example (with reference to FIG. 2), the data discovery system 100 can cause the cloud-based system 202, in a metadata scan of a data source, to update a data inventory by using the metadata-based recommendation. For example, the data discovery system 100 can apply the update to the label set from the metadata-based recommendation to an inventory object representing the data source. For instance, the data discovery system 100 can cause the cloud-based system 202 to modify the inventory object for the data source to include a label "email," which indicates that the data source contains one or more data objects for storing email addresses. Since each of these data objects may include different labels for fields that store email addresses (e.g., "primary email," "work email," "contact email," etc.), the "email" label in the inventory object facilitates subsequent identification of the data source as storing email addresses.

In addition, as mentioned above, the data discovery system 100 can utilize feedback data for labels (from the metadata-based recommendations) to modify confidence scores (or levels) of the metadata-based recommendation mappings. For instance, the recommendation feedback repository 207 can include feedback data collected and/or derived from various tenants. The feedback data can indicate, for each metadata-based recommendation, whether a user of the data discovery system 100 has accepted or rejected the metadata-based recommendation within the user's tenant. For instance, each record of feedback data can include (or refer to) one or more of a data source schema (e.g., an object or table name, a field name) for a metadata-based recommendation, a suggested label for the metadata-based recommendation, and a field indicating whether a user approved or rejected the suggested label.

Moreover, a data source schema can include a description of one or more objects, fields, and/or combinations thereof used to store different data elements. In an illustrative example, the data source schema could indicate whether a data source stores personal identifiable information (PII) and, if so, the types of date elements stored in the data source. For instance, a data source can include multiple data objects used to store different datasets used by a data asset. A first data object labeled "Account" can include a field labeled "Name," and a second data object labeled "Campaign" can also include a field labeled "Name." A first data source schema for the first object can indicate the "Account"/"Name" combination and a second data source schema for the second object can indicate the "Campaign"/"Name" combination.

In the above-mentioned example, the data discovery system 100 can utilize a metadata-based recommendation to associate the first data source schema (e.g., the "Account"/"Name" combination) to a label indicating a type of PII data element (e.g., a person's name) for the data source schema, and a confidence level from the first metadata-based recommendation. Indeed, the data discovery system 100 can cause the metadata-based recommendation service 203 to compute a confidence level (or score) based on data from the recommendation feedback repository 207. The recommendation feedback repository 207 can include log data identifying user input received from the client device(s) 110 in response to the metadata catalog service 206 presenting a "Person Name" label when the "Account"/"Name" combination is detected via a metadata scan. In a simplified example, if 90% of the logged user input indicates acceptance of the "Person Name" label that is recommended based on a metadata scan detecting the "Account"/"Name" combination, then the data discovery system 100 can cause the metadata-based recommendation service 203 to set the confidence level of the metadata-based recommendation (i.e., "Person Name" label associated with the "Account"/"Name" combination) to 90%.

In some aspects, a metadata-based recommendation can indicate that a certain data source schema is not PII. In the example above, a metadata-based recommendation can identify the second data source schema (e.g., the "Campaign"/"Name" combination) and can include data indicating that the second data source schema is not PII. For instance, if the metadata-based recommendation indicates that a certain data source schema is not PII, the metadata-based recommendation service 203 can notify the metadata catalog service 206 that PII is not included in the data source (for the second data source schema).

In some cases, the data discovery system 100 can identify a data source schema that can include, for example, a type for the field (e.g., simple datatypes such as string or integer, more complex types such as DateTime or location, etc.), whether the field value is computed from other field values (e.g., via a calculation or other formula defined for the field), whether the field is a standard field available to all users of a data asset or a custom field for use by a particular user or instance of a data asset, etc. For instance, the data discovery system 100 can utilize such examples of data source schema to generate higher confidence label recommendations for metadata scans of standard data objects. Additionally or alternatively, the data discovery system 100 can utilize such examples of data source schema to generate label recommendations for metadata scans of custom data objects.

In some instances, a custom data object can be a data object that is not available to all users of a data asset, and may only be available to certain user accounts or certain instances of the data asset. Consequently, a custom data object can include a label that does not occur frequently or consistently enough to be present in a metadata-based recommendation. As such, as an example, the data discovery system 100 can receive, from a first user of a data asset (e.g., a customer-management application), a creation or utilization a first custom data object that stores PII data elements, and, from a second user of the data asset (e.g., a customer-management application), a creation or utilization of a second custom data object that does not store PII data elements. Furthermore, if the data discovery system 100 identifies that the two custom data objects include the same object name, the data discovery system 100 can determine that a label recommendation based on the combination of the object name and a field name may not have a sufficiently high confidence level (or score) for the metadata catalog service 206 to recommend the label to a user.

In some cases, the data discovery system 100 can identify, from a data source schema for a data object, a combination of a field name and a datatype for a corresponding field. Moreover, the data discovery system 100 can identify the presence of a PII data element, such as location data (e.g., that corresponds to a data schema indicating that a field name is "location" and further indicating the datatype for the field requires that the field store latitude and longitude values). In response, the data discovery system 100 can determine, via a metadata-based recommendation, a "location" label for a data schema indicating this combination of a "location" field name "latitude/longitude" field type. Subsequently, if a metadata scan of a custom data object identifies the combination of a "location" field name "latitude/longitude" field type, then the data discovery system 100 can cause the metadata-based recommendation service 203 to recommend the "location" label for the custom data object.

In some aspects, the data discovery system 100 can also perform the above-mentioned examples above in combination. For instance, the data discovery system 100 can cause the metadata-based recommendation repository 205 to include a first recommendation for detection of a data schema including an "Account" object name and "Location" field name, and a second recommendation for detection of a data schema including an "Account" object name, a "Location" field name, and a "latitude/longitude" field type. While both recommendations could include the same "location" label, the data discovery system 100 can determine that the second recommendation includes a higher confidence level (or score) (e.g., a larger percentage of "acceptance" user feedback) due to a higher objective likelihood of a "location" data element being stored in an "Account" object with the "location" field name "latitude/longitude" field type.

Figure 3:
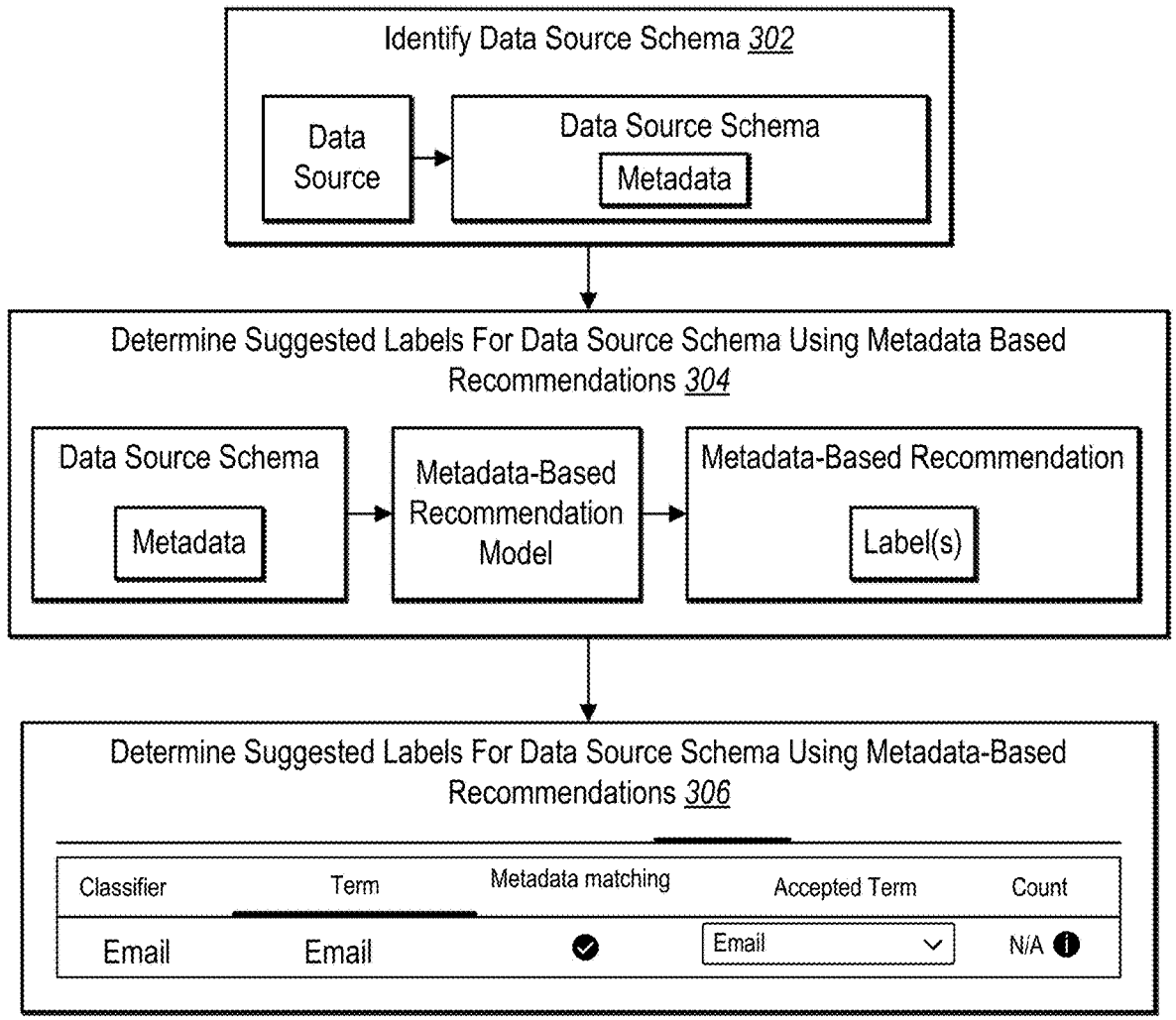
FIG. 3 illustrates an overview of a data discovery system classifying data elements from a data source using metadata from data sources in accordance with one or more implementations.

As mentioned above, in one or more aspects, the data discovery system 100 utilizes a repository of metadata-based recommendations to classify data sources using lightweight (and non-intrusive) metadata from the data sources. For example, FIG. 3 illustrates an overview of the data discovery system classifying data elements from a data source using metadata from the data sources. In particular, FIG. 3 illustrates the data discovery system 100 identifying a data source schema, determining suggested labels for a data source schema using metadata-based recommendations, and modifying a data inventory utilizing the metadata-based recommendations.

As shown in an act 302 of FIG. 3, the data discovery system 100 identifies a data source schema. In particular, the data discovery system 100 can identify a data source schema from a data source that includes metadata for the data source. Indeed, in one or more aspects, the data discovery system 100 utilizes a data source schema to identify metadata that describes various components of a data source (e.g., database types, database tables, fields, table names, column names, table data types, data source relationships, functions, database scheduled jobs). Indeed, the data discovery system 100 identifying and utilizing a data source schema is described in greater detail below (e.g., in reference to FIGS. 4-8).

Furthermore, as shown in an act 304 of FIG. 3, the data discovery system 100 determines suggested labels for a data source schema using metadata-based recommendations. As shown in the act 304 of FIG. 3, the data discovery system 100 utilizes the metadata of the data source schema with a metadata-based recommendation model to output metadata-based recommendations. Indeed, as shown in FIG. 3, the data discovery system 100 determines label(s) for the data source schema from metadata-based recommendations determined for the data source schema (e.g., using metadata matching). The data discovery system 100 utilizing a metadata-based recommendation model to select metadata-based recommendations for a data source schema is described in greater detail below (e.g., in reference to FIGS. 4 and 5).

Moreover, as shown in an act 306 of FIG. 3, the data discovery system 100 modifies a data inventory utilizing the metadata-based recommendation. In particular, the data discovery system 100 can apply labels (and/or other data type indicators) from the metadata-based recommendation to a data inventory that represents a relationship (or categorization) of one or more data elements in a data source. As an example, the data discovery system 100 can apply a label (from the metadata-based recommendation) to a column name within a data source data table based on metadata associated with the column in the data source (e.g., to represent a categorization of the one or more data elements in the data column). Furthermore, as shown in the act 306, the data discovery system 100 can display a determined label from a metadata-based recommendation within a graphical user interface to indicate the match and/or receive user feedback for the metadata-based recommendation. Indeed, the data discovery system 100 utilizing a metadata-based recommendation to modify (and present) a data inventory of a data source is described in greater detail below (e.g., in reference to FIGS. 4-8).

Example of Metadata-Based Recommendation Process

Figure 4:
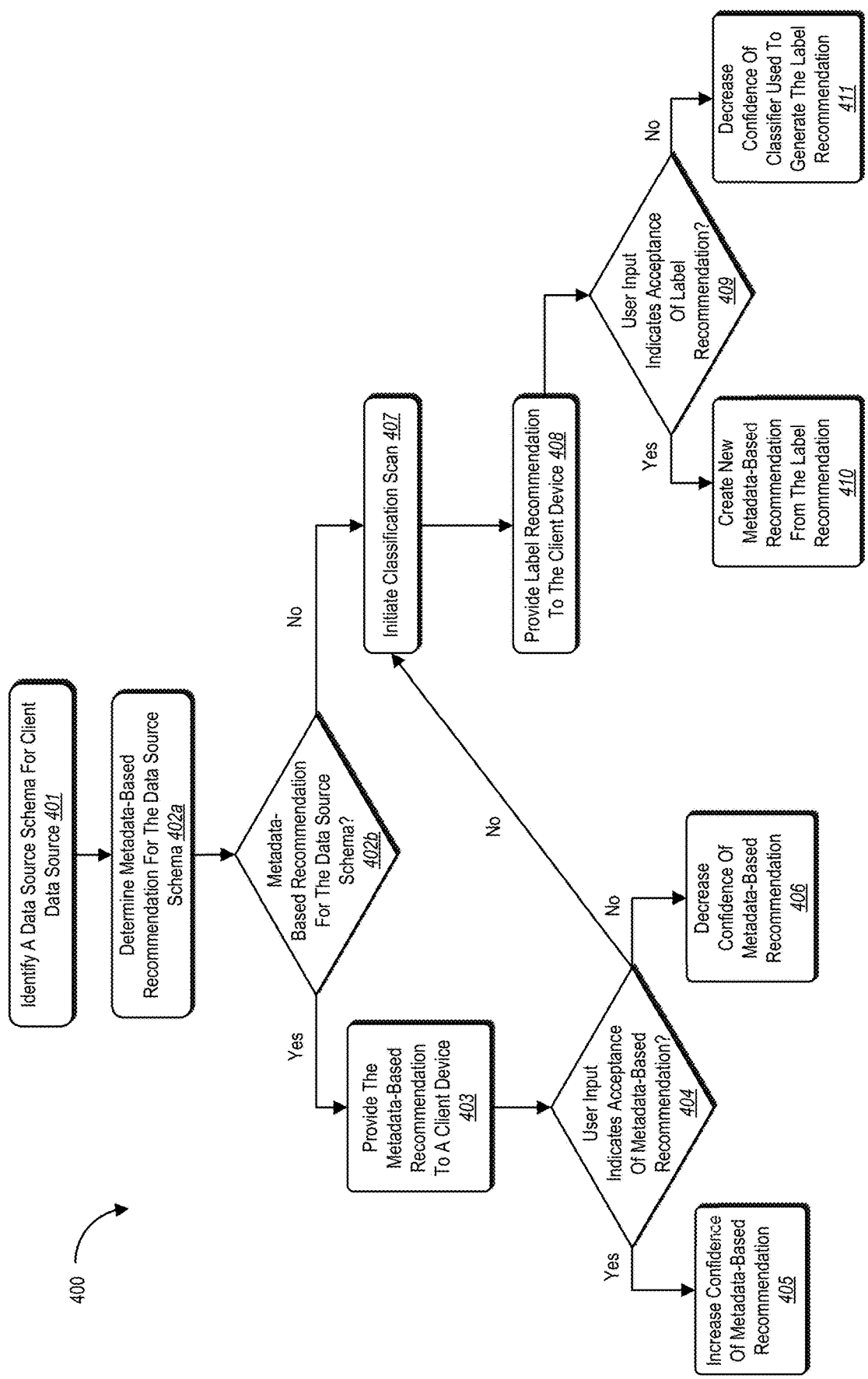
FIG. 4 illustrates an exemplary flow diagram of a data discovery system utilizing a repository of metadata-based recommendations to classify data sources using metadata from the data sources in accordance with one or more implementations.

FIG. 4 illustrates an exemplary flow diagram of the data discovery system 100 utilizing a repository of metadata-based recommendations to classify data sources using metadata from the data sources. Indeed, FIG. 4 illustrates an example of a process 400 for generating label recommendations based on metadata scans. In some aspects, one or more computing devices, such as the server device(s) 102, cloud-based system 202, and/or the on-premises system 213, implement operations depicted in FIG. 4 by executing suitable program code (e.g., one or more services depicted in FIGS. 1 and 2). For illustrative purposes, the process 400 is described with reference to certain examples depicted in the figures. Other various implementations of the data discovery system 100, however, are possible.

As shown in FIG. 4 at block 401, the process 400 involves identifying (or obtaining) a data source schema for one or more client data sources. In an illustrative example (e.g., in reference to FIG. 2), the data discovery system 100 can cause the scan control service 204 to direct the synchronization agent 214 to perform a metadata scan of one or more data sources. Moreover, the synchronization agent 214 can instruct the job manager service 215 to initiate the metadata scan. The synchronization agent 214 can receive results of the metadata scan from the job manager service 215 and provide the results of the metadata scan to the scan control service 204. The scan control service 204 can identify a data source schema from these metadata scan results. The scan control service 204 can provide the data source schema to the metadata-based recommendation service 203.

Furthermore, as shown in FIG. 4 at blocks 402a and 402b, the process 400 involves determining an availability of a metadata-based recommendation corresponding to the data source schema. For instance, the data discovery system 100 can determine a metadata-based recommendation for the data source schema in a block 402a. In an illustrative example (e.g., in reference to FIG. 2), the data discovery system 100 can cause the metadata-based recommendation service 203 to query the metadata-based recommendation repository 205 for a metadata-based recommendation that matches or otherwise corresponds to the data source schema.

In some aspects, each metadata-based recommendation in the metadata-based recommendation repository 205 can include an identifier derived from an associated data source schema. For instance, the cloud-based system 202 can apply a transformation function (e.g., hash function) to a data source schema identifying a combination of "Account" and "Name" to generate a unique identifier (e.g., a hash value) to generate an identifier of the metadata-based recommendation, and the metadata-based recommendation can be stored in the metadata-based recommendation repository 205 with that identifier. (An example of metadata-based recommendation repository 205 is depicted in FIG. 6, with identifiers of metadata-based recommendations listed in the "Metadata Id" column.) At block 402a, the data discovery system 100 can cause the metadata-based recommendation service 203 to apply the transformation function to the data source schema obtained at block 401 to generate a transformed value, and can query the metadata-based recommendation repository 205 for a metadata-based recommendation having an identifier matching that transformed value.

Then, at block 402b, if the metadata-based recommendation corresponding to the data source schema is available, the process 400 involves the data discovery system 100 providing the metadata-based recommendation to a client device, as shown in block 403. For instance (e.g., in reference to FIG. 2), the data discovery system 100 can cause the metadata-based recommendation service 203 to provide the metadata-based recommendation to the metadata catalog service 206 that communicates with client device(s) 110. The metadata catalog service 206 (via the data discovery system 100) can generate an interface that identifies a data element label included in the metadata-based recommendation. In an example depicted in FIG. 7, such a user interface includes the label "email" label displayed in the column labeled "Term." The interface can also include an interface element configured to receive user input accepting or rejecting the recommendation. In the example depicted in FIG. 7, this interface element is a clickable drop-down menu having a first option for the recommended label and one or more other options (e.g., a user-specified alternative label).

In some aspects, at block 402b of FIG. 4, the data discovery system 100 can cause the metadata-based recommendation service 203 to determine if a confidence level (or score) of the metadata-based recommendation satisfies a threshold confidence level (or score). The data discovery system 100 can determine a threshold confidence level (or score) by setting a default threshold confidence level (or score), receiving a specified threshold confidence level (or score) for a given tenant via user input received within the tenant, or some combination thereof. If the threshold confidence level (or score) is not satisfied at block 402b, the process 400 can terminate or proceed to block 407. But if the threshold confidence level (or score) is satisfied, the process 400 can proceed to block 404 (as described above).

In some aspects, if a confidence level for a metadata-based recommendation is sufficiently high (e.g., satisfies a threshold confidence level), then, in the process 400, the data discovery system 100 can proceed to block 404 even if a command to perform a scan of the data source indicated that a classification scan (e.g., a scan using one or more classifiers) should be performed. For instance, if a metadata-based recommendation with a sufficiently high confidence level is available, the data discovery system 100 more efficiently utilizes computational resources by using the metadata-based recommendation rather than devoting those computational resources to a classification scan. In some cases, the data discovery system 100 can override a "classification scan" request from a client device when a higher threshold confidence level (e.g., 90%, 85%)) is satisfied (as compared to a lesser threshold confidence level (e.g., 65%, 70%) for proceeding to block 404 when a client device requested a "metadata scan").

At block 404 of FIG. 4, the process 400 involves the data discovery system 100 determining whether user input from the client device indicates that the metadata-based recommendation is accepted. For instance (e.g., in reference to FIG. 2), the data discovery system 100 can cause the metadata catalog service 206 to receive user input via an interface that displays the metadata-based recommendation on a client device 110. The user input can indicate acceptance or rejection of the metadata-based recommendation. To illustrate, in the example depicted in FIG. 7, the data discovery system 100 receives a user input indicating acceptance of the recommended "email" label.

Furthermore, if the user input received from the client device indicates that the metadata-based recommendation is accepted, the process 400 involves the data discovery system 100 increasing a confidence level for the metadata-based recommendation, as shown at block 405 of FIG. 4. Moreover, if the user input received from the client device indicates that the metadata-based recommendation is rejected, the process 400 involves the data discovery system 100 decreasing a confidence level for the metadata-based recommendation, as shown at block 406 of FIG. 4. In an illustrative example (e.g., in reference to FIG. 2), the data discovery system 100 can cause the metadata catalog service 206 to update the recommendation feedback repository 207 to include an identifier of the metadata-based recommendation and a result of the user input (e.g., an "approved" value at block 405 or a "rejected" value at block 406). Additionally, the cloud-based system 202 can also update the confidence level for the metadata-based recommendation in the metadata-based recommendation repository 205. For instance, if a record having an "approved" value is added to the recommendation feedback repository 207, the metadata-based recommendation service 203 can calculate an increased confidence level for the metadata-based recommendation at block 405. In this example, the data discovery system 100 can cause the cloud-based system 202 to update a data inventory object by applying a label set from the metadata-based recommendation to an inventory object representing the data source.

In some instances, if a record having a "rejected" value is added to the recommendation feedback repository 207 (by the data discovery system 100), the data discovery system 100 can cause the metadata-based recommendation service 203 to calculate a decreased confidence level for the metadata-based recommendation at block 406. In this example, the cloud-based system 202 can forgo updating an inventory object for the data source with the label set obtained from the metadata-based recommendation.

In some aspects, the data discovery system 100 causes the cloud-based system 202 to utilize the results of a classification scan initiated in response to the rejection of the metadata-based recommendation to determine a modification to the confidence level (or score) of the metadata-based recommendation. For instance, such a classification scan may result in another label set, which is generated by the data discovery system 100 using a classifier set of one or more classifiers, being presented at the client device. In one or more aspects, the data discovery system 100 can determine that the label set generated using the classifier set is different from the label set included in the metadata-based recommendation. Based on difference between the suggested label set (from the metadata-based recommendation) and the label set from the classification scan, the data discovery system 100 (via the metadata catalog service 206) can update the recommendation feedback repository 207 with a "rejection" of the metadata-based recommendation (and decrease the confidence level of the metadata-based recommendation).

In some cases, the data discovery system 100 determines that the label set generated using the classifier set matches the label set included in the metadata-based recommendation. For instance, in some cases (even if a user chose to reject the metadata-based recommendation), the classification scan can result in a label set that is the same as or similar to the label set from the metadata-based recommendation. In such a case, if the data discovery system 100 (via the metadata catalog service 206) receives user input accepting the label set generated using the classifier set, the metadata catalog service 206 can update the recommendation feedback repository 207 with an "acceptance" of the metadata-based recommendation based on the accepted classifier-generated label set matching the metadata-based recommendation's label set.

In some cases, the data discovery system 100 determines that a metadata-based recommendation for the data source schema is unavailable (e.g., no matches satisfying a threshold confidence level and/or no matches found). Indeed, as shown in block 402b of FIG. 4, if the metadata-based recommendation corresponding to the data source schema is unavailable, the process 400 involves the data discovery system 100 initiating a classification scan, as shown at block 407. In some aspects, the process 400 can also involve the data discovery system 100 initiating the classification scan at block 407 if the user input from the client device indicates that a metadata-based recommendation is rejected at block 404 (e.g., utilizing classification scans using one or more classifier models as described herein).

Moreover, as shown in FIG. 4 at block 408, the process 400 involves the data discovery system 100 providing a label recommendation based on the classification scan to the client device. Indeed, the data discovery system 100 can implement block 408 in a manner similar to block 403 by providing the classifier predicted label for display on a client device. In some cases, the data discovery system 100 utilizes a confidence score corresponding to the classifier predicted label to apply the classifier predicted label to a data inventory object of the data source schema (e.g., when the confidence score satisfies a threshold confidence score).

In some cases, the data discovery system 100 provides a classifier predicted label, for display on a client device, to enable a user of the client device to accept or reject the classifier predicted label (e.g., label feedback as described above). For instance, as shown in FIG. 4 at block 409, the process 400 involves the data discovery system 100 determining whether user input from the client device indicates that the label recommendation based on the classification scan is accepted. If the user input from the client device indicates that the label recommendation based on the classification scan is accepted, the process 400 involves the data discovery system 100 creating a new metadata-based recommendation from the label recommendation to augment the metadata-based recommendation repository, as shown at block 410. For instance (e.g., with reference to FIG. 2), the data discovery system 100 can cause the metadata catalog service 206 to notify the metadata-based recommendation service 203 that a label for a data source has been accepted. The metadata-based recommendation service 203 can create a new metadata-based recommendation that includes the data source schema obtained at block 401 and the label accepted at block 409. Furthermore, the metadata-based recommendation service 203 can store the new metadata-based recommendation in the metadata-based recommendation repository 205.

If the user input from the client device indicates that the label recommendation based on the classification scan is rejected, the process 400 involves the data discovery system 100 decreasing a confidence level for one or more classifiers used to generate the label recommendation, as shown at block 411.

Indeed, as mentioned above, the data discovery system 100 can augment the metadata-based recommendation repository by utilizing a classifier model to generate predicted labels for a data source (in response to a low confidence and/or failed metadata match). For example, in reference to FIG. 4, the data discovery system 100 can perform the acts of blocks 407-410 to build or update the metadata-based recommendation repository 205 (e.g., from FIG. 2). For example, upon determining that a metadata-based recommendation repository does not include (or results in low confidence score matches) for a data source schema, the data discovery system 100 can utilize a classification scan (as described in relation to blocks 407-410) to generate a classifier predicted label and create a new metadata-based recommendation from the classifier predicted label by generating a mapping between the newly created metadata-based recommendation and metadata from the data source schema of the data source (as described in relation to block 401).

In some aspects, the data discovery system 100 can perform the acts of blocks 407-410 even if a metadata-based recommendation corresponding to a data source schema is available. For instance, if the settings for a discovery scan indicate that the scan type is a classification scan type, the data discovery system 100 can cause the scan control service 204 to instruct the synchronization agent 214 to perform a classification scan. In this example, the scan control service 204 can obtain metadata for the data source (i.e., the data source schema), since a classification scan will also identify metadata of the data source being scanned. Moreover, the scan control service 204 can provide the data source schema to the metadata-based recommendation service 203, which can search for a metadata-based recommendation (as described above at blocks 402a and 402b). In this example, the determination at block 408 can be used to implement blocks 405 or 406. For instance, the data discovery system 100 can increase the confidence level of a stored metadata-based recommendation with a certain data element label if a user accepts a recommendation of the data element label generated via a classification scan, and vice versa. In this manner, the data discovery system 100 can utilize feedback generated via classification scans in some tenants of the cloud-based system 202 to increase the confidence of metadata-based recommendations provided via metadata scans requested by other tenants of the cloud-based system 202.

In one or more aspects, the data discovery system 100 can utilize feedback from multiple users belonging to different tenants to augment and/or create a centralized (and universal) metadata-based recommendation repository. In particular, the data discovery system 100 can utilize user feedback for metadata-based recommendations (as described above) for metadata matches of multiple data sources belonging to different tenants to modify confidence levels (or scores) within a centralized metadata-based recommendation repository. Moreover, in some aspects, the data discovery system 100 can also utilize classifier model created labels (as described above) with metadata mappings from data source schemas (as described above) from multiple, different tenants to augment the centralized metadata-based recommendation repository. Indeed, the data discovery system 100 can further access the shared metadata-based recommendations in the metadata-based recommendation repository to generate labels for data elements in data sources of the different tenants using data source schemas from the tenants.

As an example, (e.g., with reference to FIG. 2), the data discovery system 100 can enable the cloud-based system 202 to be accessed by multiple tenants, where each tenant can be used to access that tenant's data assets (e.g., data sources) but cannot be used to access one or more other tenants' data assets. In an execution of process 400 by a first tenant for the first tenant's data source schema, receiving a "no" result at block 402*b* can cause the process 400 to proceed to block 407 (by the data discovery system 100), which results in the generation of a metadata-based recommendation. In a subsequent execution of the process 400 by a second tenant (via the data discovery system 100), the generation of the metadata-based recommendation (e.g., based on the first tenant's execution of process 400) can result in a "yes" result at block 402*b*, thereby allowing the second tenant to perform blocks 404-406 and use the metadata-based recommendation to update a data inventory for the second tenant.

Indeed, as mentioned above, by using a metadata-based recommendation process, such as the process 400, the data discovery system 100 can improve computational efficiency of data discovery and classification. For example, data assets and data sources may often use object names and field names that, either alone or in combination, would not necessarily indicate to a given user of a client device 110 user that PII is stored in a data source. Using the metadata-based recommendation service 203 (via the data discovery system 100) can facilitate classification of data elements in data sources that would be infeasible to classify via manual efforts. Furthermore, in some aspects, using the metadata-based recommendation service 203 (via the data discovery system 100) can also reduce the computing resources required for such classification by avoiding the need to sample data elements and apply classifiers to the sampled data. Additionally, using the metadata-based recommendation service 203 (via the data discovery system 100) enables data sources to be classified as having certain types of data elements without requiring sampling or other potential exposure of sensitive data found in the data sources (i.e., without conducting intrusive data analyses on data elements contained within a data source).

Figure 5:
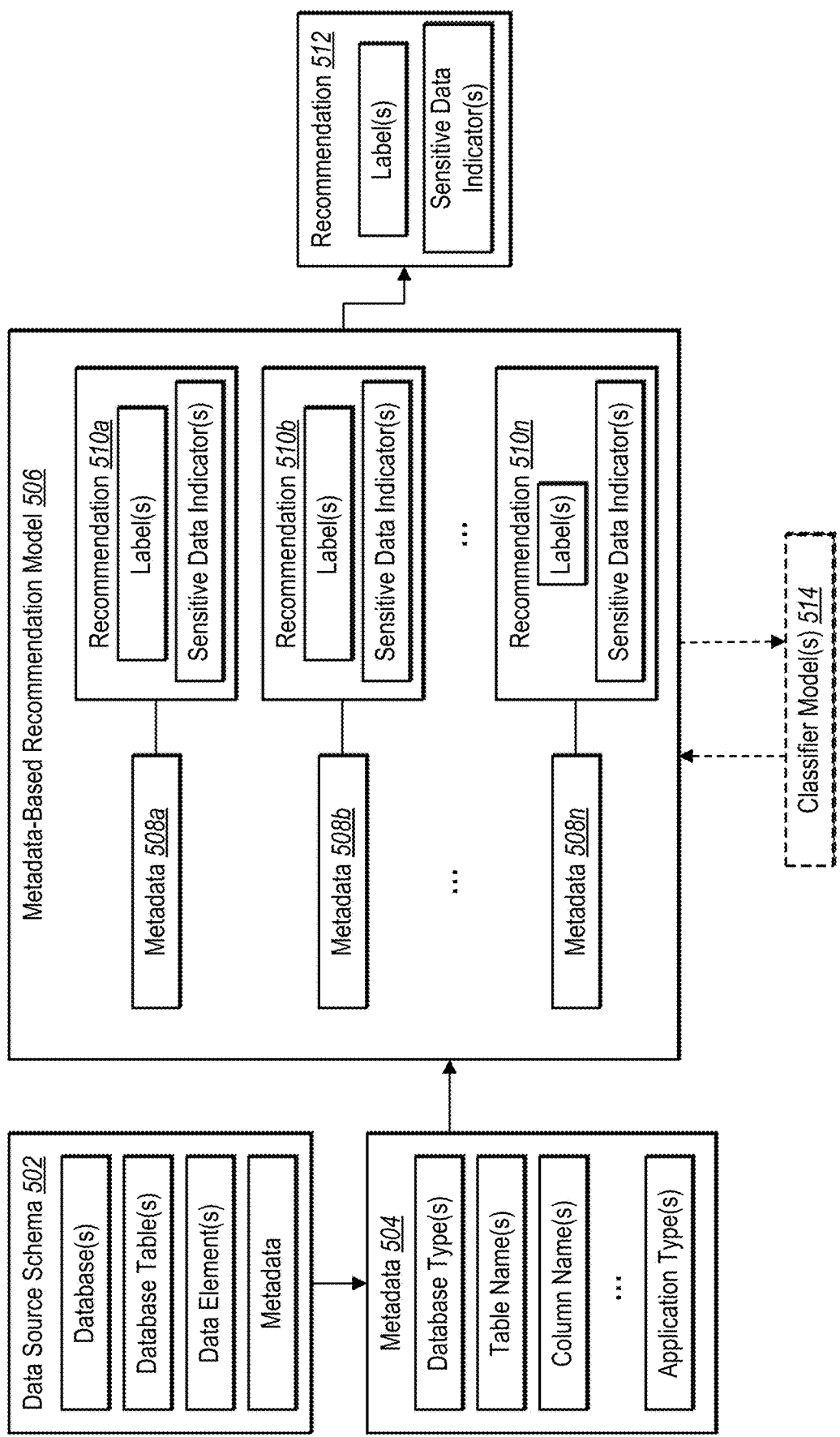
FIG. 5 illustrates a data discovery system utilizing a metadata-based recommendation model in accordance with one or more implementations.

As described above, the data discovery system 100 utilizes a metadata-based recommendation model to match metadata from a data source schema to a metadata-based recommendation. For example, FIG. 5 illustrates the data discovery system 100 utilizing a metadata-based recommendation model. In particular, FIG. 5 illustrates the data discovery system 100 utilizing metadata from a data source schema with a metadata-based recommendation model to generate a metadata-based recommendation that includes one or more label(s) for data elements of a data source.

For instance, as shown in FIG. 5, the data discovery system 100 identifies a data source schema 502 of a data source and obtains metadata 504 from the data source schema 502. In addition, as shown in FIG. 5, the data discovery system 100 utilizes a metadata-based recommendation model 506 that includes mappings between metadata 508*a*-508*n* with various recommendations 510*a*-510*n* to select a metadata-based recommendation for the metadata 504. Indeed, in one or more aspects, the data discovery system 100 matches the metadata 504 to one or more of the metadata 508*a*-508*n* to select a nearest metadata match (e.g., utilizing similarity distances, clustering, hashing, and/or word matching between the metadata). Then, as shown in FIG. 5, upon selecting a metadata match from the metadata 508*a*-508*n*, the data discovery system 100 utilizes the corresponding recommendation from the recommendations 510*a*-510*n* as the output recommendation 512 for the data source schema 502.

In some cases, as shown in FIG. 5, the data discovery system 100 utilizes a classifier model. For instance, the data discovery system 100 can determine that the metadata 504 is unable to match with metadata from the metadata-based recommendation model 506 (e.g., via low confidence similarity, low confidence scores corresponding to the recommendations, and/or no matches). Upon determining that the metadata 504 is unable to match with the metadata, the data discovery system 100 can utilize a classifier model(s) 514 to analyze the data source schema 502 (via data element(s) and/or metadata) to generate a predicted classifier label(s) (as described above). Then, the data discovery system 100 can utilize the generated predicted classifier label(s) generated by the classifier model(s) 514 to output the recommendation 512. In addition, the data discovery system 100 can utilize the metadata 504 and the generated predicted classifier label(s) to create a metadata-based recommendation mapping within the metadata-based recommendation model 506 (as described above).

For instance, as shown in FIG. 5, the data discovery system 100 can determine a recommendation 512 for the data source schema 502. Indeed, the recommendation 512 (e.g., a metadata-based recommendation) can include label(s) for, but not limited to, one or more data elements, databases, database tables of the data source schema 502 of a data source. In addition, the data discovery system 100 can also identify various other data indicators from the recommendation 512. As shown in FIG. 5, the data discovery system 100 can receive a sensitive data indicator(s) that flags or indicates data elements in the data source schema 502 in a sensitive data category (e.g., PII data). Indeed, the data discovery system 100 can identify a variety of labels and/or data indicators from a metadata-based recommendation (as described above).

Additionally, as mentioned above, the data discovery system 100 utilizes a metadata-based recommendation repository. For instance, FIG. 6 illustrates an exemplary record of a metadata-based recommendation repository utilized by the data discovery system 100. For example, as shown in FIG. 6, the data discovery system 100 can identify a record from a metadata-based recommendation repository to identify recommended term(s) and confidence score(s) for corresponding metadata (e.g., data source name, object, field, Xpath). Additionally, as shown in FIG. 6, the data discovery system 100 can also identify a feedback status of a metadata-based recommendation record indicating an accuracy of a relation between the metadata in the record and the corresponding recommended term(s).

In addition, as shown in FIG. 6, the data discovery system 100 can generate a metadata ID (e.g., a hash) for a metadata-based recommendation record in the repository. Indeed, in one or more aspects, the data discovery system 100 generates the metadata ID based on various combinations of metadata in a record (e.g., a hash generated from the metadata, a random number generated using the metadata as a seed). Then, the data discovery system 100 can utilize the metadata ID during metadata matching to match the metadata within the records of the metadata-based recommendation repository with a metadata ID generated from target metadata of a target data source schema. Indeed, in some cases, the data discovery system 100 utilizes hash matching between metadata of a target data source schema and the metadata IDs within the metadata-based recommendation repository records to select a metadata-based recommendation (in accordance with one or more implementations herein).

As also mentioned above, the data discovery system 100 can provide, for display within a graphical user interface, one or more metadata-based recommendations for a data schema of a data source. In some cases, the data discovery system 100 can display one or more metadata-based recommendations with selectable options to provide user feedback on labels (e.g., acceptance and/or change of terms). Indeed, FIG. 7 illustrates the data discovery system 100 displaying metadata-based recommendations and selectable options to provide feedback on the metadata-based recommendations within a graphical user interface of a client device.

Figure 7:
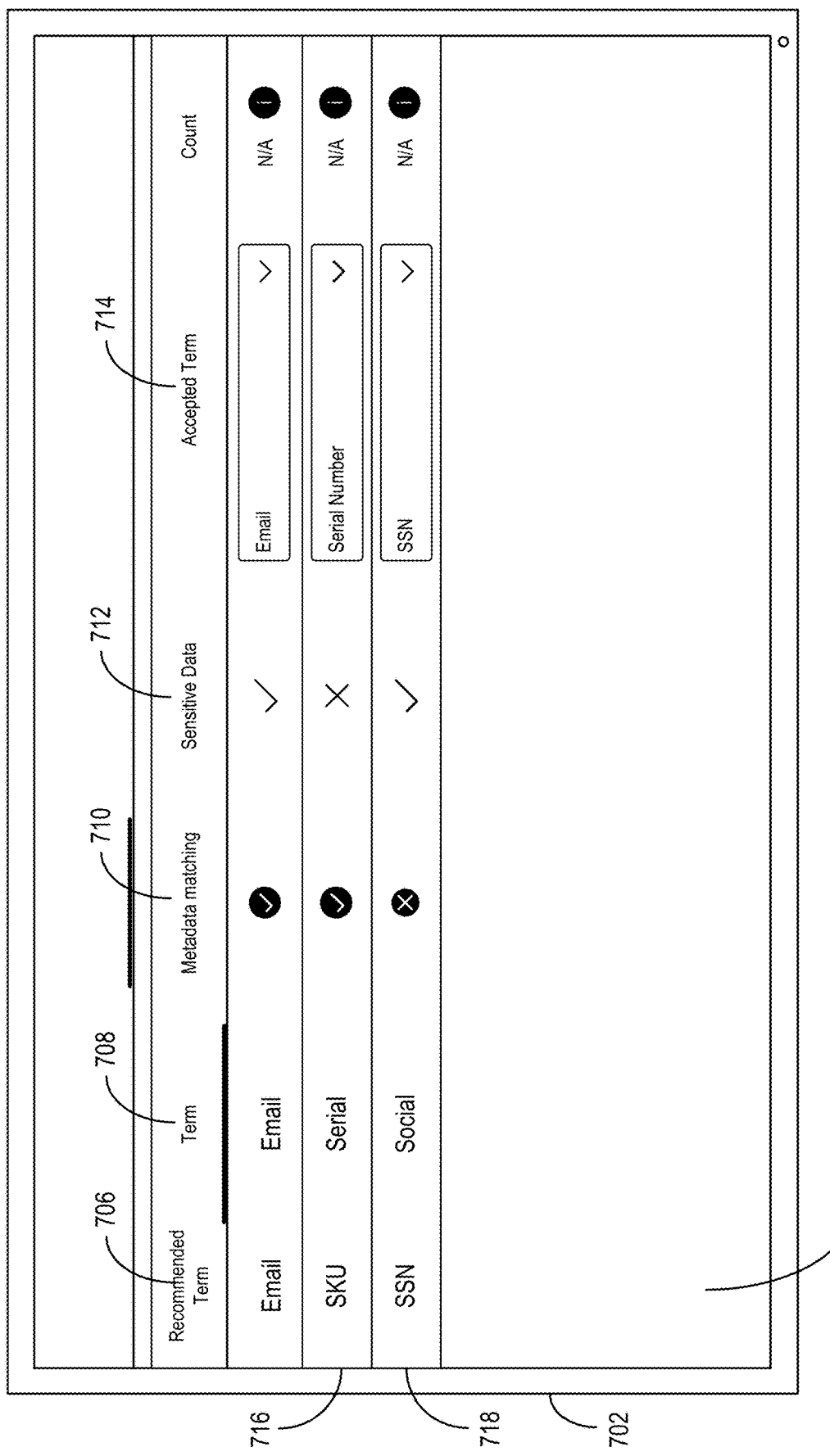
FIG. 7 illustrates a data discovery system displaying metadata-based recommendations and selectable options to provide feedback on the metadata-based recommendations in accordance with one or more implementations.

As shown in FIG. 7, the data discovery system 100 provides, for display within a graphical user interface 704 of a client device 702, a presentation of one or more determined labels for a data source schema. As shown in FIG. 7, the data discovery system 100 displays a recommended term 706 (e.g., a label) for a term 708 (from a data source schema) determined utilizing a metadata-based recommendation model (or a classifier model) in accordance with one or more implementations herein. For example, as shown in row 718 of the graphical user interface 704, the data discovery system 100 determines a label of "SSN" for a data source schema term of "Social."

As further shown in FIG. 7, the data discovery system 100 enables user selection of terms to receive feedback for the metadata-based recommendation (or classifier) as described above. In particular, as shown in FIG. 7, the data discovery system 100 displays a selectable option element 714 (e.g., a dropdown menu) to select an accepted term for the recommended term 706 (or the term 708). As shown in FIG. 7, the data discovery system 100 can receive a selected term in the selectable option element 714 that matches the recommended term (e.g., in row 718, "SSN" matches the accepted term of "SSN") as an indication that the metadata-based recommendation (or classifier recommendation) was correct. Additionally, as also shown in FIG. 7, the data discovery system 100 can receive a selected term in the selectable option element 714 that does not match the recommended term (e.g., in row 716, "SKU" does not match the accepted term "Serial Number") as an indication that the metadata-based recommendation (or classifier recommendation) was incorrect. The data discovery system 100 utilizes the selected accepted term as feedback to adjust the metadata-based recommendation model (or classifier model) and/or confidence scores associated with the models in accordance with one or more implementations herein. Although a dropdown menu is displayed for the selectable option element 714, the data discovery system 100 can display various types of selectable option elements, such as, but not limited to, radio buttons, text boxes, and/or slider tools.

As also shown in FIG. 7, the data discovery system 100 displays a metadata matching indicator 710 within the graphical user interface 704. In particular, the data discovery system 100 can determine whether a metadata-based recommendation or a classifier model-based term is provided (as the recommended term 706) for the data source schema term 708. Moreover, the data discovery system 100 displays the metadata matching indicator 710 to indicate whether a metadata-based recommendation is utilized for the particular recommended term 706. For example, in row 716 of the graphical user interface 704 of FIG. 7, the data discovery system 100 indicates that a metadata-based recommendation was utilized for the recommended term. Furthermore, as shown in row 718 of the graphical user interface 704 of FIG. 7, the data discovery system 100 indicates that a metadata-based recommendation was not utilized for the recommended term.

In addition, the data discovery system 100 can also displays other data indicators determined from the metadata-based recommendation model (and/or classifier model). For instance, as shown in FIG. 7, the data discovery system 100 determines whether a data source schema term (representing one or more data elements) constitutes sensitive data (e.g., PII data) in accordance with one or more implementations herein and displays the indication as a sensitive data indicator 712 (in the graphical user interface 704). In particular, as shown in row 716 of the graphical user interface 704 of FIG. 7, the data discovery system 100 indicates that the term 708 (or recommended term 706) (e.g., "SKU" or "Serial") does not represent sensitive data. Additionally, as shown in row 718 of the graphical user interface 704 of FIG. 7, the data discovery system 100 indicates that the term 708 (or recommended term 706) (e.g., "SSN" or "Social") does represent sensitive data. Although a specific type of data indicator is shown, the data discovery system 100 can determine and display various data indicators (or flags) in accordance with one or more implementations herein.

Continuous Data Classification Example

As mentioned above, the data discovery system 100 can continuously update a data classification for a data source via a metadata scan of the data source. Indeed, in some aspects, the data discovery system 100 can include continuous data classification functionality, either in addition to the metadata-based recommendation service described above (or in an alternative aspect of the data discovery system 100 that lacks a metadata-based recommendation service). In these aspects, the data discovery system 100 can perform a metadata scan of a data source accessible to the on-premises system 213. The data discovery system 100 can perform the metadata scan according to a schedule, such as a schedule specified by one or more user inputs received via a client device 110. The data discovery system 100 can use comparisons of a metadata (e.g., data source schemas) obtained from data sources via the scheduled metadata scans to determine whether to perform classification scans on some or all of a given data source, thereby utilizing computing resources more efficiently. In particular, the data discovery system can utilize a metadata scan to identify modified metadata from a data source schema and match the additional metadata from the modified metadata to a metadata-based recommendation from the metadata-based recommendation repository to determine an additional label (or classification) for the data source.

Figure 8:
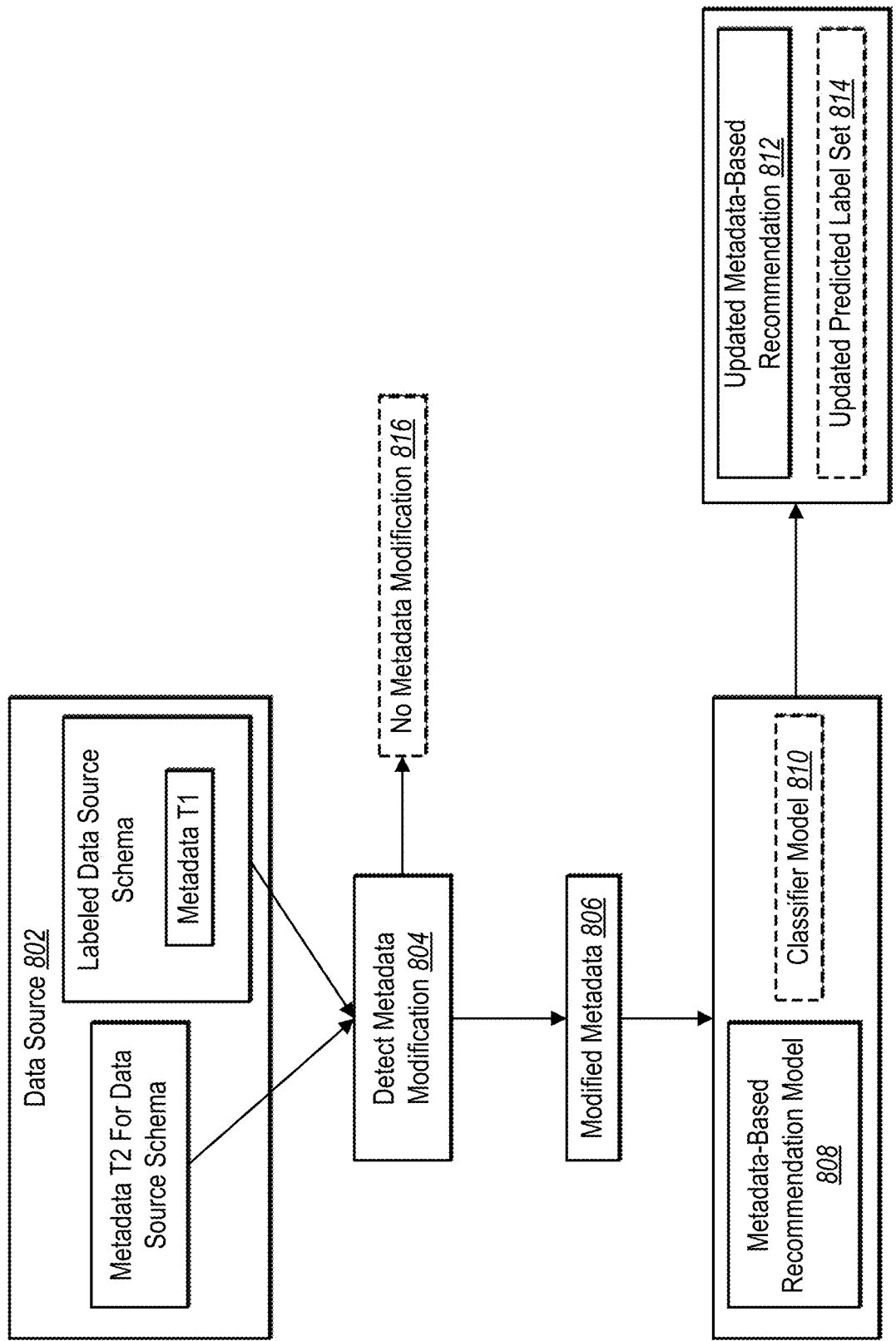
FIG. 8 illustrates a data discovery system continuously updating a data classification for a data source via a metadata scan of the data source in accordance with one or more implementations.

For example, FIG. 8 illustrates the data discovery system 100 continuously updating a data classification for a data source via a metadata scan of the data source. In particular, as shown in FIG. 8, the data discovery system 100 identifies a labeled data source schema with metadata T1 (e.g., at a first time instance) and metadata T2 for the data source schema (e.g., at a second time instance) from a data source 802. Furthermore, the data discovery system 100 in an act 804 detects metadata modifications between the metadata T1 and the metadata T2 to identify modified metadata 806. Then, the data discovery system 100 utilizes the modified metadata 806 with the metadata-based recommendation model 808 to determine an updated metadata-based recommendation 812 (in accordance with one or more implementations herein).

In some cases, as shown in FIG. 8, the data discovery system 100 identifies, during the act 804, no metadata modification 816 between metadata T1 and metadata T2. In response, the data discovery system 100 can forego performing a metadata-based recommendation determination on the metadata T2. In addition, in some instances and as shown in FIG. 8, the data discovery system 100 can utilize a classifier model 810 for the modified metadata 806 (and/or additional data elements of a data source 802) to generate an updated predicted label set 814 (in accordance with one or more implementations herein).

As an example, the data discovery system 100 can cause the scan control service 204 to perform, via suitable instructions to the synchronization agent 214, a first metadata scan of a data source and a second, subsequent metadata scan of the data source. Moreover, the scan control service 204 can obtain, via the synchronization agent 214, first metadata of the data source outputted by the first scan and second metadata of the data source outputted by the second scan. The scan control service 204 can compare the first metadata and the second metadata. If the scan control service 204 identifies a difference between the first metadata and the second metadata that indicates a change in the data source, the scan control service 204 can cause, via suitable instructions to the synchronization agent 214, a classification scan of at least part of the data source.

For instance, the following Table 2 illustrates non-limiting examples of metadata from data sources that can be compared using continuous data classification by the data discovery system 100.

TABLE 2

| Type of data stored in data source | Metadata examples |
| --- | --- |
| Relational Database | Database Name; Database Schema; Table; Column Name; Column Type; Nullable |
| Non-Relational Database | Collection Name; Field Name; Field Type |
| Enterprise App (API) | Path; Object Name; Field Name; Field Description; Field Type |
| File Repository (Unstructured) | File Name; File Size; File Location; Created Date; Created By; Last accessed date; Last accessed by; MD5 checksum hash |
| Email | Mailbox name; message subject; message size; message created date |

In some aspects, the data discovery system 100 performs continuous data classification on a data source that includes structured data. In these aspects, metadata of the data source can include the names of data objects (e.g., tables) found in the data source, the names fields (e.g., columns) found in one or more of the data objects, etc.

In an example involving a data source with structured data, if the scan control service 204 (via the data discovery system 100) determines that a data object name (e.g., table name) or field name (e.g., column name) is present in the second metadata and absent from the first metadata, the scan control service 204 can initiate a classification scan (e.g., a metadata-based recommendation scan and/or a classifier model scan) via instructions to the synchronization agent 214. This difference between the first and second metadata can result from a data object or field being added to the data source (e.g., adding a new table or column), from a data object or field being renamed within the data source, or some combination thereof. Such a difference could indicate that a new type of data element has been added to the data source, and therefore that classifier labels applied to the data source should be reviewed and possibly updated (e.g., a newly added "LEG_NAM" column could include data elements that should be labeled "name"). In some aspects, the data discovery system 100 can cause the scan control service 204 to initiate a classification scan that is limited to a subset of the data source that includes the previously unseen data object or field (i.e., the new or changed table or column). For instance, the instructions sent to the synchronization agent 214 can specify that classification scan should be limited only to the previously unseen data object or field.

Continuing with the example involving a data source with structured data, if the scan control service 204 determines that a data object name (e.g., table name) or field name (e.g., column name) is present in the first metadata and absent from the second metadata, the scan control service 204 can initiate a classification scan (e.g., a metadata-based recommendation scan and/or a classifier model scan) via instructions to the synchronization agent 214. If a previously seen data object or field is absent from a current set of metadata, this could indicate that the classifier labels previously applied to the data source should be updated to remove at least one classifier label. Indeed, the data discovery system 100 can remove a label upon determining that the previously seen data object or field is absent in updated (or modified) metadata.

In some cases, the data discovery system 100 can further perform a classification scan (e.g., using a classifier model) to determine which label to remove. For instance, if the classifier labels "SSN," "Phone Number," and "Credit Card" have been applied to a data source having a column with an ambiguous name, such as "NUM_ATT_1," and the ambiguously name column in the data source is subsequently deleted, then the absence of the "NUM_ATT_1" column name from a subsequent set of metadata does not does not indicate which of the classifier labels should be removed, the data discovery system 100 can utilize a classification scan to determine which label to remove. In some cases, the data discovery system 100 utilizes logs of scans to identify associations between data objects or fields and the corresponding classifier labels applied to a data source. For instance, a log of a scan can indicate, to the data discovery system 100, that data elements of type "Phone Number" were found in the "NUM_ATT_1" column. But even in these cases, the absence of "NUM_ATT_1" from a subsequent set of metadata can indicate, to the data discovery system 100, that other changes have been performed that impact other data or fields of the data source. In response to detecting the absence of a previously seen data object or field, the data discovery system 100 can trigger a classification scan to provide an efficient and/or reliable way of updating the labels applied to a data source.

Although the examples above involve data sources with structured data, the data discovery system 100 can, additionally or alternatively, use the continuous data classification functionality for unstructured data. In cases involving unstructured data, the data discovery system 100 can compare metadata identifying data source properties other than (or in addition to) table and column names. For instance, the data discovery system 100 can obtain, in a first metadata scan, first metadata identifying a set of folder names and associated file names for folders and files stored in a data source, and, in a second subsequent metadata scan, can obtain second metadata identifying folder names and associated file names for folders and files stored in the data source. If the first and second metadata differ regarding folder names and/or file names (e.g., presence of previously unseen folder or file, absence of previously seen folder or file), then the data discovery system 100 can cause the scan control service 204 to initiate a classification scan in accordance with one or more examples described herein.

As mentioned above, in one or more aspects, the data discovery system 100 can utilize the metadata-based recommendation service 203 during continuous data classification. For instance, in the illustrative example above involving first metadata from a first metadata scan and second metadata from a second, subsequent metadata scan, the first metadata can include a first data source schema and the second metadata can include a second data source schema. Moreover (in reference to FIG. 4), the data discovery system 100 can cause the metadata-based recommendation service 203 to determine, at blocks 402a-402b of the process 400, that no metadata-based recommendation corresponding to the first data source schema is available and proceed accordingly in the process 400. If the scan control service 204 subsequently identifies a change between the first and second data source schemas, the scan control service 204 can cause the metadata-based recommendation service 203 to perform the process 400 with the second data source schema. If the metadata-based recommendation service 203 determines, at blocks 402a-402b of the process 400, that a metadata-based recommendation corresponding to the second data source schema is available, the metadata-based recommendation service 203 can proceed accordingly in the process 400, which can involve forgoing a classification scan if user input from the client device indicates that the metadata-based recommendation selected using the second data source schema is accepted.

Prioritizing Classifiers for Data Discovery Based on Past Results.

In some instances, the data discovery system 100 prioritizes classifiers for data discovery based on historical (or past) classifier results. For example, in a discovery scan, the data discovery system 100 can cause the on-premises system 213 to apply one or more of the classifiers to batches of test data that have been extracted by one or more of the scanners 216. Indeed, batch sizes can include a user-configured number and/or a number automatically configured by the data discovery system 100. For instance, the data discovery system 100 can utilize a configuration setting in a scan profile to indicate that each set of 100 records should be sampled (scanned from the data source) and classified before initiating sampling and/or classification of additional rows.

For instance, a classifier, via the data discovery system 100, receives a batch (i.e., a dataset) as a stream and determines which data element labels (e.g., SSN, phone number, etc.) to suggest as the classification for dataset. The data discovery system 100 can utilize the classification of test data to enable the on-premises system 213 to increase or decrease the confidence level of a classifier label applied based on metadata extracted by one or more scanners 216. Such a metadata-based classification (e.g., the "meta intent match" depicted in FIG. 4) can include, for example, the on-premises system 213 classifying a column in a table using the column name, such as matching a column name "Bdate" identified from scanned metadata for the table to a classifier label "Birth Date."

In existing (or conventional) systems, this classification process is often time-consuming and complex for large datasets, such as a table with millions of rows. For example, the classification process, in many conventional systems, can involve looking at every JSON document or every column in a table and applying a set of classifiers (or sub-classifiers) in a predefined order. For example, some systems apply a "name" classifier to a column, followed by a "phone number" classifier, and so on. This application of classifiers in the predefined order can inefficiently consume computing resources (e.g., processing cycle, storage, network bandwidth) if a given classifier does not apply to large portions of the data in the column (e.g., applying a "name" classifier to a column where over 90% of the records are phone numbers).

In contrast to such systems, certain aspects of the data discovery system 100 can address this inefficient resource consumption during the data discovery process. In one or more aspects, the data discovery system 100 causes the on-premises system 213 to dynamically update the order in which classifiers are applied based on which classifiers have successfully classified data within a data source (e.g., determined a classifier label with a sufficiently high confidence that satisfies a threshold confidence score). In an illustrative example, one or more scanners 216 in the on-premises system 213, of the data discovery system 100, can sample or otherwise extract test data from a column of a table in a data source. The test data can include heterogeneous data elements (e.g., a mix of credit card numbers and social security numbers, both of which were in the same column). Moreover, the data discovery system 100 can cause the on-premises system 213 to select a first classifier from a classifier set, where the classifiers are organized in a certain order of priority. The on-premises system 213 can apply the first classifier to a first batch of the test data, and thereby determines, with sufficiently high confidence (that satisfies a threshold confidence), a first classifier label for 10% of the data samples in the first batch. The on-premises system 213 then can select and apply a second classifier from the classifier set to the first batch of the test data, and thereby can determine, with sufficiently high confidence (that satisfies a threshold confidence), a second classifier label for 70% of the data samples in the first batch.

Continuing with this example, the on-premises system 213 can update the order of priority so that the second classifier (70% success rate for the first batch) is prioritized before the first classifier (10% success rate for the first batch). For a second batch of the test data, the on-premises system 213 can apply the second classifier to the batch before applying the first classifier.

In some aspects, the data discovery system 100 can cause the on-premises system 213 to simply set the second classifier as the top priority and does not otherwise modify other classifiers' priorities. The data discovery system 100 can prioritize the second classifier as described above to allow the most successful classifier to be prioritized quickly without devoting resources to changing the sequence of other classifiers.

In additional or alternative aspects, the on-premises system 213 can update the order of priority according to the success rates of all classifiers. For instance, in the current example, if the on-premises system 213 selects and applies a third classifier to the first batch that determines, with sufficiently high confidence (that satisfies a threshold confidence), a third classifier label for 20% of the data samples in the first batch, then the on-premises system 213 can update the order of priority so that the third classifier (20% success rate) is prioritized after the second classifier (70% success rate) and before the first classifier (10% success rate). The on-premises system 213 can utilize this priority (second classifier, then third classifier, the first classifier) to classify the subsequent batch of test data.

In some aspects, the data discovery system 100 utilizes an aggregator service (e.g., aggregator service 226) executed by the on-premises system 213 to track the distribution of successful classifiers in a data set. For instance, for every record that is classified, the aggregator can maintain a list of classifier labels generated by applying one or more classifiers to a data source (e.g., the list of classifier labels applied based on classifying a set of columns from a table). The aggregator service can track the counts of classifier labels per column and the sample values for those columns. For example, if the database table has ten rows and three columns (e.g., "Firstname," "Lastname" and "BirthDate,"), then the aggregator service can create a record summarizing which classifier labels have been applied to which column after classification of the first row, such as [column: Firstname, label: firstname, count:1], [column: Lastname, label: lastname, count:1], [column:BirthDate, label: dateofbirth, count:1]. After 10 rows have been classified, the aggregator service would aggregate the label counts as follows: [column: Firstname, label: firstname, count:10], [column: Lastname, label: lastname, count:10], [column:BirthDate, label: dateofbirth, count:10]. When classifying a batch of test data, the on-premises system 213 can determine the order of classifiers from this aggregation date. For instance, if the count of "firstname" labels applied to data in the "Firstname" column exceeds the count of "dateofbirth" labels applied to data in the "Firstname" column, then on-premises system 213 can apply a "Name" classifier to a subsequent batch of test data before applying a "Date" classifier.

Figure 9:
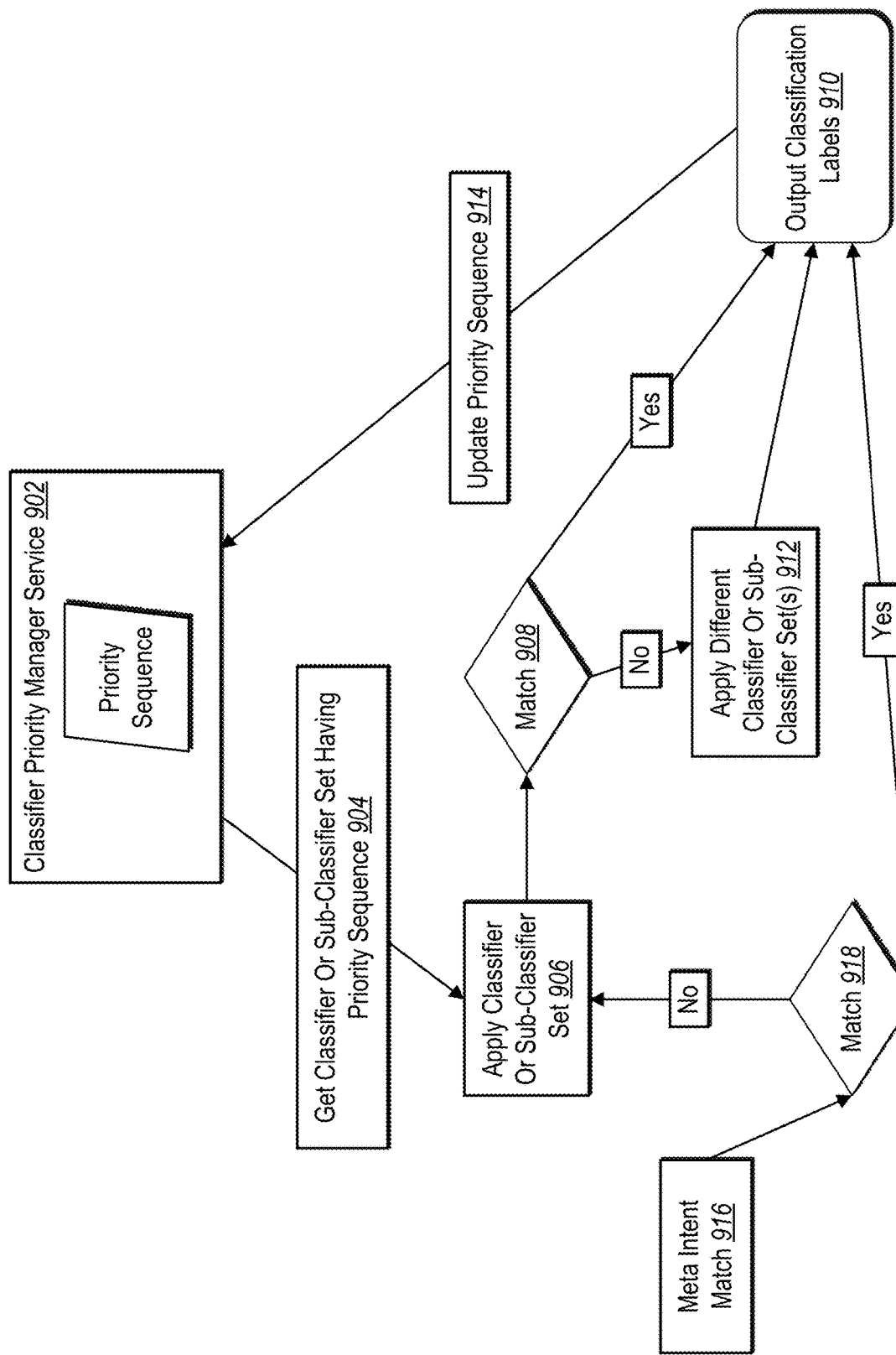
FIG. 9 illustrates a data discovery system updating classifier priorities for a set of classifier models in accordance with one or more implementations.

In some aspects, a data discovery system 100 utilizes a classifier priority manager service (e.g., via a data intent manager service 222) to provide and update classifier priorities for a set of classifiers, as depicted in FIG. 9. For example, the classifier priority manager service, which can be executed on the on-premises system 213 as depicted in the example of FIG. 2, can maintain a priority sequence. The priority sequence can be an order in which to apply classifiers or to apply sub-classifiers within a classifier group. For instance, the priority sequence will determine an order in which a set of classifiers or sub-classifiers priorities will be applied after if a "meta-intent match" stage does not result in a classification of sufficiently high confidence. Indeed, the "meta intent match" can include classifying a dataset based on matching metadata such as a column name to a lookup list, or otherwise classifying the dataset based on metadata extracted from a data source rather than test data sampled from the data source (e.g., as described above with respect to the metadata-based recommendation service 203).

In the example of FIG. 9, the classifier priority manager service will identify a priority sequence for a previously used classifier set (e.g., classifiers or sub-classifiers in one or more previous test data batches). The on-premises system 213 will apply one or more classifiers or sub-classifiers from the classifier set in the order specified by the priority sequence. If a successful classification occurs by applying the classifier set (or a subset thereof), the on-premises system 213 will forgo evaluating other sequence of classifiers or sub-classifiers.

In this example, priority sequences can be stored in a TreeSet data structure to maintain the order of classifiers or sub-classifiers based on confidence scores. Nonetheless, the data discovery system 100 can utilize various storage structures (e.g., an array structure, a list structure) to maintain the order of classifiers or sub-classifiers. Moreover, the data discovery system 100 can map each example of priority sequences to a metadata event.

For instance, in FIG. 9, the classifier priority manager service 902 can include a priority sequence as an array of classifier and/or sub-classifier identifier for a given column or other suitable element of a data structure. Indeed, as shown in act 904 of FIG. 9, the classifier priority manager service 902 obtains a classifier or sub-classifier set having a priority sequence. Then, in an act 906, the data discovery system 100 applies the classifier or sub-classifier set to classify data samples. Moreover, as shown in act 908 of FIG. 9, the data discovery system matches the classifications (e.g., to existing classification labels) to determine if the classifications were successful. As shown in FIG. 9, if the classifications were successful, the data discovery system 100, outputs the classification labels 910 (e.g., with an unchanged priority sequence).

Furthermore, as shown in FIG. 9, if the data discovery system 100 determines, in the act 908, that the classifications were unsuccessful (e.g., the data samples could not be classified with sufficiently high confidence using the classifier set identified in the array), the data discovery system 100, in act 912, applies different classifiers or sub-classifiers, which are not in the identifier classifier set, to classify the data samples. Furthermore, the data discovery system 100 utilizes the output classification labels 910 (from the act 912) to update the priority sequence (in an act 914) to include the classifiers or sub-classifiers that were successful at classifying the data samples after the classifiers or sub-classifiers from the priority sequence were unsuccessful.

Additionally, as shown in act 916 of FIG. 9, in some cases, the data discovery system 100 utilizes a meta intent match to determine classification labels for the data samples (in accordance with one or more implementations herein). Indeed, the data discovery system 100 utilizes the meta intent match (from the act 916) to match (in an act 918) the classifications (e.g., to existing classification labels) to determine if the classifications were successful (or accurate). Indeed, if the classifications from the meta intent match are successful, the data discovery system 100 updates the priority sequence (in an act 914) to include the meta intent match (from the act 916). In some cases, when the classifications from the meta intent match are unsuccessful, the data discovery system 100 performs the act 906 to determine a priority sequence of the classifier or sub-classifier set.

Figure 10:
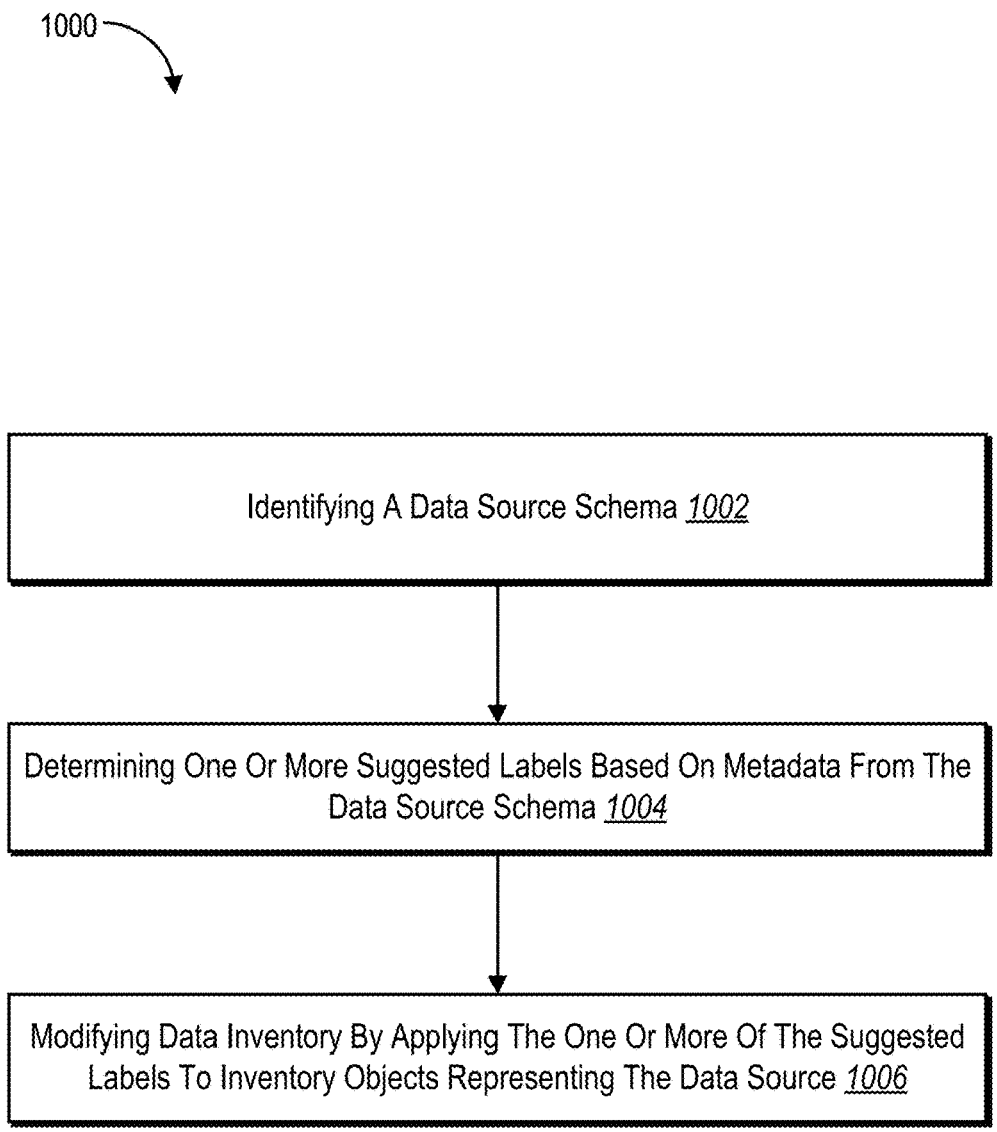
FIG. 10 illustrates a flowchart of a series of acts for utilizing a repository of metadata-based recommendations to classify data sources using metadata from the data sources in accordance with one or more implementations.

FIGS. 1-9, the corresponding text, and the examples provide a number of different methods, systems, devices, and non-transitory computer-readable media of the data discovery system 100. In addition to the foregoing, one or more aspects can also be described in terms of flowcharts comprising acts for accomplishing a particular result, as shown in FIG. 10. The acts shown in FIG. 10 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 10. In some aspects, a system can be configured to perform the acts of FIG. 10. Alternatively, the acts of FIG. 10 can be performed as part of a computer implemented method.

For example, FIG. 10 illustrates a flowchart of a series of acts 1000 for utilizing a repository of metadata-based recommendations to classify data sources using metadata from the data sources in accordance with one or more implementations. While FIG. 10 illustrates acts according to one aspect, alternative aspects may omit, add to, reorder, and/or modify any of the acts shown in FIG. 10.

As shown in FIG. 10, the series of acts 1000 include an act 1002 of identifying a data source schema, an act 1004 of determining one or more suggested labels based on metadata from the data source schema, and an act 1006 of modifying a data inventory by applying the one or more of the suggested labels to the inventory objects representing the data source.

In one or more aspects, the act 1002 can include identifying a data source schema corresponding to a set of data elements for a data source, the act 1004 can include determining one or more suggested labels for the data source schema by matching metadata from the data source schema to a metadata-based recommendation from a metadata-based recommendation repository comprising metadata-based recommendations based on a confidence score between the metadata and the metadata-based recommendation, wherein the metadata-based recommendations comprise labels categorizing data elements in data sources, and the act 1006 can include modifying a data inventory by applying one or more suggested labels from the metadata-based recommendation to an inventory object representing the data source to categorize the set of data elements.

Furthermore, the series of acts 1000 can include providing, for display with a graphical user interface of a client device, one or more suggested labels for the data source schema and modifying the data inventory by applying one or more suggested labels based on receiving a user input, via the graphical user interface, accepting one or more suggested labels for the data source schema. In addition, the series of acts 1000 can include updating the confidence score between the metadata and the metadata-based recommendation based on the user input accepting one or more suggested labels for the data source schema. In some instances, the series of acts 1000 can include applying one or more suggested labels from the metadata-based recommendation to the inventory object representing the data source upon determining the confidence score between the metadata and the metadata-based recommendation satisfies a threshold confidence score.

Additionally, the series of acts 1000 can include metadata that includes a database type corresponding to the data source schema, one or more table names corresponding to the data source schema, one or more column names corresponding to the data source schema, or application types associated with the data source schema. In some instances, the series of acts 1000 can include a metadata-based recommendation that includes comprises a classifier predicted label set from analyzing one or more historical data source schemas corresponding historical data sources. Furthermore, the series of acts 1000 can include a suggested label that includes one or more suggested table names or one or more suggested column names for one or more data tables or one or more data columns corresponding to the set of data elements for the data source. Moreover, the series of acts 1000 can include an inventory object that includes a data table or data column corresponding to the set of data elements for the data source.

Moreover, the series of acts 1000 can include determining the one or more suggested labels for the data source schema by determining one or more suggested table names or one or more suggested column names for one or more data tables or one or more data columns corresponding to the set of data elements for the data source. In some cases, the series of acts 1000 can include determining that the one or more suggested labels for the data source schema correspond to a sensitive personal data category based on the metadata-based recommendation.

Additionally, the series of acts 1000 can include identifying an additional data source schema corresponding to a set of additional data elements for an additional data source, generating a predicted label set corresponding to the set of additional data elements for the additional data source by utilizing a classifier with the set of additional data elements, mapping the predicted label set to additional metadata from the additional data source schema, and storing the mapping between the predicted label set and the additional metadata within the metadata-based recommendation repository as the metadata-based recommendation. Furthermore, the series of acts 1000 can include identifying the data source from a first user and identifying the additional data source from a second user differing from the first user.

Furthermore, the series of acts 1000 can include identifying an additional data source schema corresponding to a set of additional data elements for an additional data source, generating a predicted label set corresponding to the set of additional data elements for the additional data source by utilizing a classifier with the set of additional data elements, and increasing the confidence score between the metadata and the metadata-based recommendation based on at least one of (1) the predicted label set matching, at least in part, the one or more suggested labels corresponding to the metadata-based recommendation or the metadata matching, at least in part, additional metadata from the additional data source schema.

In some cases, the series of acts 1000 can include identifying an additional data source schema corresponding to a set of additional data elements for an additional data source, determining one or more additional suggested labels for the additional data source schema utilizing a metadata-based recommendation match from the metadata-based recommendation repository, and upon receiving user input, via a graphical user interface, rejecting one or more additional suggested labels for the additional data source schema. For instance, the series of acts 1000 can include rejecting one or more additional suggested labels for the additional data source schema by decreasing an additional confidence score corresponding to the metadata-based recommendation match, generating a predicted label set corresponding to the additional data elements for the additional data source by utilizing a classifier with the additional data elements, and storing a mapping between the predicted label set and the additional data source schema within the metadata-based recommendation repository as an additional metadata-based recommendation.

Additionally, the series of acts 1000 can include detecting modified metadata from the data source schema for the data source to identify additional metadata and determining one or more additional suggested labels for the data source schema by (1) matching the additional metadata from the data source schema to an additional metadata-based recommendation from the metadata-based recommendation repository or (2) generating a predicted label set corresponding to a subset of data elements corresponding to the additional metadata from the data source schema by utilizing a classifier with the subset of data elements.

Example of Computing Systems and Devices for Implementing Various Aspects

Aspects of the present disclosure may comprise or utilize a special purpose or general-purpose computer including computer hardware, such as, for example, one or more processors and system memory, as discussed in greater detail below. Aspects within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, aspects of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some aspects, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

This disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Aspects of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
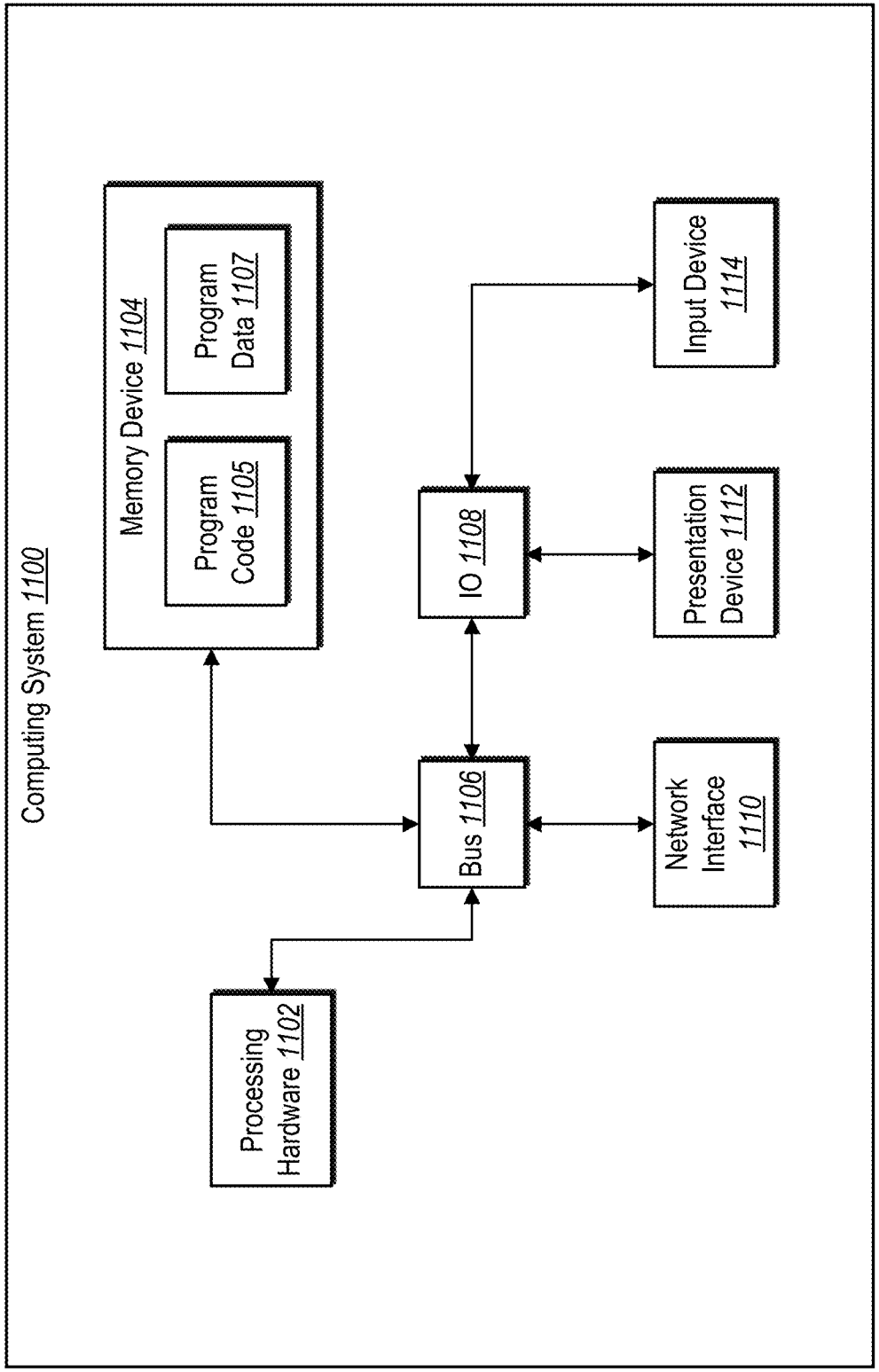
FIG. 11 illustrates a block diagram of an example computing device in accordance with one or more implementations.

FIG. 11 depicts an example of a computing system 1100 that can be used for performing the operations described herein. One or more devices depicted in FIGS. 1 and 2 (e.g., server device(s) 102, a cloud-based system 202, an on-premises system 213, a client device 110, etc.) can be implemented using the computing system 1100 or a suitable variation.

The computing system 1100 can include processing hardware 1102 that executes program code 1105 (e.g., one or more of the software services depicted in FIGS. 1 and 2). The computing system 1100 can also include a memory device 1104 that stores one or more sets of program data 1107 (e.g., a recommendation feedback repository 207, a metadata-based recommendation repository 205, etc.) computed or used by operations in the program code 1105. The computing system 1100 can also include one or more presentation devices 1112 and one or more input devices 1114. For illustrative purposes, FIG. 11 depicts a single computing system on which the program code 1105 is executed, the program data 1107 is stored, and the input devices 1114 and presentation device 1112 are present. But various applications, datasets, and devices described can be stored or included across different computing systems having devices similar to those depicted in FIG. 11.

The depicted example of a computing system 1100 includes processing hardware 1102 communicatively coupled to one or more memory devices 1104. The processing hardware 1102 executes computer-executable program instructions stored in a memory device 1104, accesses information stored in the memory device 1104, or both. Examples of the processing hardware 1102 include a microprocessor, an application-specific integrated circuit ("ASIC"), a field-programmable gate array ("FPGA"), or any other suitable processing device. The processing hardware 1102 can include any number of processing devices, including a single processing device.

The memory device 1104 includes any suitable non-transitory computer-readable medium for storing data, program instructions, or both. A computer-readable medium can include any electronic, optical, magnetic, or other storage device capable of providing a processor with computer-readable instructions or other program code 1105. Non-limiting examples of a computer-readable medium include a magnetic disk, a memory chip, a ROM, a RAM, an ASIC, optical storage, magnetic tape or other magnetic storage, or any other medium from which a processing device can read instructions. The program code 1105 may include processor-specific instructions generated by a compiler or an interpreter from code written in any suitable computer-programming language, including, for example, C, C++, C#, Visual Basic, Java, Python, Perl, JavaScript, and ActionScript.

The computing system 1100 may also include a number of external or internal devices, such as an input device 1114, a presentation device 1112, or other input or output devices. For example, the computing system 1100 is shown with one or more input/output ("I/O") interfaces 1108. An I/O interface 1108 can receive input from input devices or provide output to output devices. One or more buses 1106 are also included in the computing system 1100. The bus 1106 communicatively couples one or more components of a respective one of the computing system 1100.

The computing system 1100 executes program code 1105 that configures the processing hardware 1102 to perform one or more of the operations described herein. The program code 1105 includes, for example, the digital design application, the brand engine, the design engine, or other suitable program instructions that perform one or more operations described herein. The program code 1105 may be resident in the memory device 1104 or any suitable computer-readable medium and may be executed by the processing hardware 1102 or any other suitable processor. The program code 1105 uses or generates program data 1107.

In some implementations, the computing system 1100 also includes a network interface device 1110. The network interface device 1110 includes any device or group of devices suitable for establishing a wired or wireless data connection to one or more data networks. Non-limiting examples of the network interface device 1110 include an Ethernet network adapter, a modem, and/or the like. The computing system 1100 is able to communicate with one or more other computing devices via a data network using the network interface device 1110.

A presentation device 1112 can include any device or group of devices suitable for providing visual, auditory, or other suitable sensory output. Non-limiting examples of the presentation device 1112 include a touchscreen, a monitor, a separate mobile computing device, etc. An input device 1114 can include any device or group of devices suitable for receiving visual, auditory, or other suitable input that controls or affects the operations of the processing hardware 1102. Non-limiting examples of the input device 1114 include a recording device, a touchscreen, a mouse, a keyboard, a microphone, a video camera, a separate mobile computing device, etc.

Although FIG. 11 depicts the input device 1114 and the presentation device 1112 as being local to the computing device that executes the program code 1105, other implementations are possible. For instance, in some implementations, one or more of the input devices 1114 and the presentation device 1112 can include a remote client-computing device (e.g., a client device 110 depicted in FIGS. 1 and 2) that communicates with the computing system 1100 via the network interface device 1110 using one or more data networks described herein.

General Considerations

In the foregoing specification, the present disclosure has been described with reference to specific exemplary aspects thereof. Various aspects and aspects of the present disclosure(s) are described with reference to details discussed herein, and the accompanying drawings illustrate the various aspects. The description above and drawings are illustrative of the disclosure and are not to be construed as limiting the disclosure. Numerous specific details are described to provide a thorough understanding of various aspects of the present disclosure.

The present disclosure may be embodied in other specific forms without departing from its spirit or essential characteristics. The described aspects are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:
identifying, by processing hardware, a data source schema corresponding to a set of data elements for a data source;
determining, by the processing hardware, one or more suggested labels for the data source schema by:

matching metadata from the data source schema to a metadata-based recommendation from a metadata-based recommendation repository comprising metadata-based recommendations based on confidence scores between the metadata and the metadata-based recommendation, wherein the metadata-based recommendations comprise labels categorizing data elements in data sources; and determining a suggested label from the metadata-based recommendations of the metadata-based recommendation repository when a confidence score satisfies a threshold confidence score and generating a predicted suggested label utilizing a classifier model when an additional confidence score is below the threshold confidence score;

providing, for display within a graphical user interface of a client device and by the processing hardware, one or more selectable option elements for the one or more suggested labels for the data source enabling acceptance or modification of the one or more suggested labels;

providing, for display within the graphical user interface of the client device and by the processing hardware, one or more metadata matching indicators to indicate the determination of the suggested label is determined from the metadata-based recommendation repository and that an additional suggested label is generated utilizing the classifier model; and modifying, by the processing hardware, a data inventory by applying the one or more suggested labels from the metadata-based recommendation to an inventory object representing the data source to categorize the set of data elements.

2. The computer-implemented method of claim 1, further comprising:

providing, for display with a graphical user interface of a client device, the one or more suggested labels for the data source schema; and modifying, by the processing hardware, the data inventory by applying the one or more suggested labels based on receiving a user input with the one or more selectable option elements, via the graphical user interface, accepting the one or more suggested labels for the data source schema.

3. The computer-implemented method of claim 2, further comprising updating, by the processing hardware, the confidence score between the metadata and the metadata-based recommendation based on the user input accepting the one or more suggested labels for the data source schema.

4. The computer-implemented method of claim 1, wherein the metadata comprises a database type corresponding to the data source schema, one or more table names corresponding to the data source schema, one or more column names corresponding to the data source schema, or application types associated with the data source schema.

5. The computer-implemented method of claim 1, wherein determining the one or more suggested labels for the data source schema comprises determining one or more suggested table names or one or more suggested column names for one or more data tables or one or more data columns corresponding to the set of data elements for the data source.

6. The computer-implemented method of claim 5, wherein applying the one or more suggested labels from the metadata-based recommendation to the inventory object comprises applying the one or more suggested table names or the one or more suggested column names to the inventory object, the inventory object comprising a data table or data column corresponding to the set of data elements for the data source.

7. The computer-implemented method of claim 1, further comprising determining, by the processing hardware, that the one or more suggested labels for the data source schema correspond to a sensitive personal data category based on the metadata-based recommendation.

8. The computer-implemented method of claim 1, wherein the metadata-based recommendation comprises a classifier predicted label set from analyzing one or more historical data source schemas corresponding historical data sources.

9. The computer-implemented method of claim 1, further comprising:

identifying, by the processing hardware, an additional data source schema corresponding to a set of additional data elements for an additional data source;

generating, by the processing hardware, one or more additional suggested labels for the additional data source schema by:

determining one or more additional confidence scores for an additional metadata-based recommendations from matching the metadata-based recommendation repository and additional metadata from the additional data source schema;

based on the one or more additional confidence scores, generating, by the processing hardware, a predicted label set corresponding to the set of additional data elements for the additional data source by utilizing the classifier model with the set of additional data elements; and mapping, by the processing hardware, the predicted label set to additional metadata from the additional data source schema; and storing the mapping between the predicted label set and the additional metadata within the metadata-based recommendation repository as the metadata-based recommendation.

10. The computer-implemented method of claim 9, further comprising:

identifying, by the processing hardware, the data source from a first user; and identifying, by the processing hardware, the additional data source from a second user differing from the first user.

11. The computer-implemented method of claim 1, further comprising:

identifying, by the processing hardware, an additional data source schema corresponding to a set of additional data elements for an additional data source;

generating, by the processing hardware, a predicted label set corresponding to the set of additional data elements for the additional data source by utilizing the classifier model with the set of additional data elements; and increasing, by the processing hardware, the confidence score between the metadata and the metadata-based recommendation based on at least one of:

the predicted label set matching, at least in part, the one or more suggested labels corresponding to the metadata-based recommendation; or the metadata matching, at least in part, additional metadata from the additional data source schema.

12. One or more non-transitory computer-readable media storing processor-executable instructions thereon that, when executed by at least one processor, cause the at least one computer processor to:

identify a data source schema corresponding to a set of data elements for a data source;
determine one or more suggested labels for the data source schema by:
matching metadata from the data source schema to a metadata-based recommendation from a metadata-based recommendation repository comprising metadata-based recommendations based on confidence scores between the metadata and the metadata-based recommendation, wherein the metadata-based recommendations comprise labels categorizing data elements in data sources; and
determining a suggested label from the metadata-based recommendations of the metadata-based recommendation repository when a confidence score satisfies a threshold confidence score and generating a predicted suggested label utilizing a classifier model when an additional confidence score is below the threshold confidence score;
provide, for display within a graphical user interface of a client device and by the at least one processor, one or more selectable option elements for the one or more suggested labels for the data source enabling acceptance or modification of the one or more suggested labels;
provide, for display within the graphical user interface of the client device and by at least one processor, one or more metadata matching indicators to indicate the determination of the suggested label is determined from the metadata-based recommendation repository and that an additional suggested label is generating utilizing the classifier model; and
modify a data inventory by applying the one or more suggested labels from the metadata-based recommendation to an inventory object representing the data source to categorize the set of data elements.

13. The one or more non-transitory computer-readable media of claim 12, wherein the processor-executable instructions, when executed by the at least one processor, further cause the at least one processor to apply the one or more suggested labels from the metadata-based recommendation to the inventory object representing the data source over generating the predicted suggested label utilizing the classifier model upon determining the confidence scores between the metadata and the metadata-based recommendation satisfies the threshold confidence score.

14. The one or more non-transitory computer-readable media of claim 12, wherein the processor-executable instructions, when executed by the at least one processor, further cause the at least one processor to:
identify an additional data source schema corresponding to a set of additional data elements for an additional data source;
determine one or more additional suggested labels for the additional data source schema utilizing a metadata-based recommendation match from the metadata-based recommendation repository; and
upon receiving user input with the one or more selectable option elements, via the graphical user interface, reject one or more additional suggested labels for the additional data source schema by:
decreasing a particular confidence score corresponding to the metadata-based recommendation match;
generating a predicted label set corresponding to the set of additional data elements for the additional data source by utilizing the classifier model with the set of additional data elements; and
storing a mapping between the predicted label set and the additional data source schema within the metadata-based recommendation repository as an additional metadata-based recommendation.

15. The one or more non-transitory computer-readable media of claim 12, wherein the processor-executable instructions, when executed by the at least one processor, further cause the at least one computer processor to:
detect modified metadata from the data source schema for the data source to identify additional metadata; and
determine one or more additional suggested labels for the data source schema by:
matching the additional metadata from the data source schema to an additional metadata-based recommendation from the metadata-based recommendation repository; or
generating a predicted label set corresponding to a subset of data elements corresponding to the additional metadata from the data source schema by utilizing the classifier model with the subset of data elements.

16. A system comprising:
one or more non-transitory computer readable media comprising a digital data source;
and processing hardware configured to cause the system to:
identify a data source schema corresponding to a set of data elements for a data source;
determine one or more suggested labels for the data source schema by:
matching metadata from the data source schema to a metadata-based recommendation from a metadata-based recommendation repository comprising metadata-based recommendations based on confidence scores between the metadata and the metadata-based recommendation, wherein the metadata-based recommendations comprise labels categorizing data elements in data sources; and
determining a suggested label from the metadata-based recommendations of the metadata-based recommendation repository when a confidence score satisfies a threshold confidence score and generating a predicted suggested label utilizing a classifier model when an additional confidence score is below the threshold confidence score;
provide, for display within a graphical user interface of a client device and by the processing hardware, one or more selectable option elements for the one or more suggested labels for the data source enabling acceptance or modification of the one or more suggested labels;
provide, for display within the graphical user interface of the client device and by the processing hardware, one or more metadata matching indicators to indicate the determination of the suggested label is determined from the metadata-based recommendation repository and that an additional suggested label is generated utilizing the classifier model; and
modify a data inventory by applying the one or more suggested labels from the metadata-based recommendation to an inventory object representing the data source to categorize the set of data elements.

17. The system of claim 16, wherein the processing hardware is further configured to cause the system to:
provide, for display with a graphical user interface of a client device, the one or more suggested labels for the data source schema; and modify the data inventory by applying the one or more suggested labels based on receiving a user input with the one or more selectable option elements, via the graphical user interface, accepting the one or more suggested labels for the data source schema.

18. The system of claim 16, wherein:
the metadata comprises a database type corresponding to the data source schema, one or more table names corresponding to the data source schema, one or more column names corresponding to the data source schema, or application types associated with the data source schema;
the one or more suggested labels comprise one or more suggested table names or one or more suggested column names for one or more data tables or one or more data columns corresponding to the set of data elements for the data source; and the inventory object comprises a data table or data column corresponding to the set of data elements for the data source.

19. The system of claim 16, wherein the processing hardware is further configured to cause the system to determine that the one or more suggested labels for the data source schema correspond to a sensitive personal data category based on the metadata-based recommendation.

20. The system of claim 16, wherein the metadata-based recommendation comprises a classifier predicted label set from analyzing one or more historical data source schemas corresponding historical data sources.

* * * * *